(12) United States Patent
Gad et al.

(10) Patent No.: US 12,507,250 B2
(45) Date of Patent: Dec. 23, 2025

(54) NESTED CELL STRUCTURE

(71) Applicant: Nokia Solutions and Networks Oy, Espoo (FI)

(72) Inventors: Robert Gad, Cracow (PL); Dariusz Palka, Cracow (PL)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 19/087,963

(22) Filed: Mar. 24, 2025

(65) Prior Publication Data

US 2025/0310967 A1 Oct. 2, 2025

(30) Foreign Application Priority Data

Mar. 26, 2024 (FI) ..................................... 20245340

(51) Int. Cl.
*H04W 72/23* (2023.01)
*H04W 72/1263* (2023.01)
*H04W 72/52* (2023.01)

(52) U.S. Cl.
CPC ....... *H04W 72/23* (2023.01); *H04W 72/1263* (2013.01); *H04W 72/52* (2023.01)

(58) Field of Classification Search
CPC ....... H04W 72/23; H04W 4/80; H04W 84/12; H04W 72/0446; H04W 12/06;

(Continued)

(56) References Cited

U.S. PATENT DOCUMENTS

2011/0103243 A1* 5/2011 Larsson ................ H04L 5/0096
370/252
2013/0258936 A1* 10/2013 Choi ..................... H04L 5/0053
370/312

(Continued)

FOREIGN PATENT DOCUMENTS

CA     2215079 A1   3/1999
EP     3328110 A1   5/2018

(Continued)

OTHER PUBLICATIONS

"3rd Generation Partnership Project; Technical Specification Group Radio Access Network; NR; Radio Resource Control (RRC) protocol specification (Release 17)", 3GPP TS 38.331, V17.6.0, Sep. 2023, pp. 1-1337.

(Continued)

*Primary Examiner* — Nathan S Taylor
(74) *Attorney, Agent, or Firm* — SQUIRE PATTON BOGGS (US) LLP

(57) ABSTRACT

Apparatuses and methods in a communication system are disclosed. A cell defining Synchronization Signal Block is transmitted (400) on a first frequency location inside a given frequency bandwidth and a second Synchronization Signal Block (402) on a second frequency location inside a second bandwidth inside the given frequency bandwidth. A main cell is provided (404) on the given frequency bandwidth by utilising the cell defining Synchronization Signal Block; at least one second cell is provided (406) on the second bandwidth within the given frequency bandwidth by utilising the second Synchronization Signal Block, the main and the at least one second cell serving the same geographical area.

18 Claims, 5 Drawing Sheets

(58) Field of Classification Search
CPC . H04W 24/10; H04W 72/0453; H04W 88/02; H04W 88/06; H04W 24/02; H04W 88/08; H04W 4/02; H04W 24/08; H04W 4/029; H04W 48/16; H04W 84/18; H04W 72/21; H04W 76/10; H04W 64/00; H04W 72/04; H04W 4/70; H04W 76/14; H04W 74/0833; H04W 72/20; H04W 76/27; H04W 4/06; H04W 4/40; H04W 48/18; H04W 12/08; H04W 16/14; H04W 4/12; H04W 4/021; H04W 4/023; H04W 8/005; H04W 76/15; H04W 72/542; H04W 28/06; H04W 76/11; H04W 52/0216; H04W 8/26; H04W 48/08; H04W 72/12; H04W 24/00; H04W 72/02; H04W 6/28; H04W 88/04; H04W 92/18; H04W 36/08; H04W 56/001; H04W 16/28; H04W 48/20; H04W 4/90; H04W 72/1268; H04W 4/14; H04W 52/146; H04W 84/042; H04W 72/30; H04W 72/541; H04W 24/04; H04W 12/02; H04W 28/18; H04W 4/24; H04W 52/0229; H04W 8/24; H04W 74/0808; H04W 8/18; H04W 88/16; H04W 4/38; H04W 74/006; H04W 60/00; H04W 12/04; H04W 72/51; H04W 84/045; H04W 4/44; H04W 8/04; H04W 76/19; H04W 80/02; H04W 4/50; H04W 76/12; H04W 56/00; H04W 72/046; H04W 80/04; H04W 74/002; H04W 4/08; H04W 8/22; H04W 52/367; H04W 48/10; H04W 72/044; H04W 12/069; H04W 72/56; H04W 4/00; H04W 74/08; H04W 68/02; H04W 72/54; H04W 56/0015; H04W 4/16; H04W 28/04; H04W 74/0816; H04W 68/00; H04W 4/025; H04W 72/1263; H04W 88/085; H04W 92/20; H04W 64/006; H04W 76/20; H04W 92/02; H04W 8/183; H04W 28/0268; H04W 40/02; H04W 16/18; H04W 76/30; H04W 4/18; H04W 72/1273; H04W 64/003; H04W 76/18; H04W 60/04; H04W 4/027; H04W 28/16; H04W 4/20; H04W 36/14; H04W 72/232; H04W 28/02; H04W 4/46; H04W 52/325; H04W 12/50; H04W 68/005; H04W 84/047; H04W 88/10; H04W 56/0045; H04W 72/569; H04W 8/02; H04W 36/0085; H04W 72/52; H04W 12/041; H04W 28/24; H04W 36/0061; H04W 72/53; H04W 52/0235; H04W 12/03; H04W 74/004; H04W 40/22; H04W 48/02; H04W 36/18; H04W 4/21; H04W 8/245; H04W 76/50; H04W 4/60; H04W 84/06; H04W 48/14; H04W 8/08; H04W 52/0206; H04W 4/33; H04W 28/26; H04W 36/0058; H04W 52/02; H04W 36/30; H04W 72/0473; H04W 16/32; H04W 76/40; H04W 36/302; H04W 52/42; H04W 52/243; H04W 52/242; H04W 12/12; H04W 8/20; H04W 12/63; H04W 74/0838; H04W 52/0209; H04W 28/22; H04W 16/10; H04W 36/22; H04W 12/068; H04W 72/00; H04W 4/024; H04W 4/10; H04W 88/18; H04W 28/10; H04W 12/033; H04W 76/16; H04W 74/04; H04W 24/06; H04W 72/1215; H04W 52/50; H04W 36/0033; H04W 52/346; H04W 52/0225; H04W 8/205; H04W 52/241; H04W 52/0219; H04W 28/00278; H04W 12/0431; H04W 80/00; H04W 88/12; H04W 52/34; H04W 88/14; H04W 4/48; H04W 16/26; H04W 52/24; H04W 36/06; H04W 84/20; H04W 52/143; H04W 72/121; H04W 36/0072; H04W 40/12; H04W 74/00; H04W 36/0055; H04W 36/04; H04W 80/10; H04W 28/065; H04W 52/40; H04W 28/14; H04W 72/231; H04W 12/35; H04W 92/10; H04W 74/0866; H04W 36/0088; H04W 40/24; H04W 12/122; H04W 52/0212; H04W 52/365; H04W 36/00; H04W 36/0066; H04W 72/27; H04W 72/543; H04W 72/535; H04W 36/0016; H04W 52/028; H04W 12/10; H04W 72/25; H04W 84/005; H04W 28/0236; H04W 36/0011; H04W 92/12; H04W 76/45; H04W 8/12; H04W 52/08; H04W 48/04; H04W 52/04; H04W 52/16; H04W 40/246; H04W 28/20; H04W 28/0289; H04W 36/02; H04W 48/06; H04W 74/085; H04W 76/25; H04W 52/0254; H04W 12/106; H04W 52/0261; H04W 8/06; H04W 76/34; H04W 36/12; H04W 36/0083; H04W 36/00837; H04W 52/36; H04W 76/22; H04W 52/52; H04W 52/0245; H04W 52/245; H04W 52/54; H04W 36/0094; H04W 52/0251; H04W 76/38; H04W 40/248; H04W 40/20; H04W 84/08; H04W 56/0005; H04W 36/0069; H04W 74/0836; H04W 16/02; H04W 74/02; H04W 36/00835; H04W 72/0466; H04W 8/186; H04W 28/12; H04W 12/71; H04W 12/72; H04W 52/0274; H04W 72/563; H04W 36/0022; H04W 16/24; H04W 28/08; H04W 28/0215; H04W 4/30; H04W 12/037; H04W 4/026; H04W 36/38; H04W 40/00; H04W 72/566; H04W 52/283; H04W 52/0258; H04W 52/267; H04W 84/10; H04W 12/062; H04W 28/0252; H04W 52/343; H04W 52/244; H04W 56/002; H04W 36/0079; H04W 74/0841; H04W 52/12; H04W 60/005; H04W 88/184; H04W 76/23; H04W 36/322; H04W 36/305; H04W 12/084; H04W 28/0284; H04W 12/37; H04W 36/1446; H04W 84/04; H04W 28/0205; H04W 36/304; H04W 12/61; H04W 12/126; H04W 36/32; H04W 36/1443; H04W 36/00692; H04W 80/08; H04W 52/18; H04W 36/0064; H04W 4/42; H04W 52/10; H04W 36/0038; H04W 16/22; H04W 72/40; H04W 74/06; H04W 12/77; H04W 92/24; H04W 84/14; H04W 52/38; H04W 12/082; H04W 52/281; H04W 56/0035; H04W 40/36; H04W 28/0231; H04W 8/082; H04W 80/06; H04W 36/144; H04W 76/00; H04W 36/0005; H04W 12/0433; H04W 52/383; H04W 36/36; H04W 52/48; H04W 52/362; H04W 36/362; H04W 52/44; H04W 52/0248;
H04W 36/0007; H04W 12/088; H04W
36/26; H04W 52/247; H04W 28/0263;
H04W 36/24; H04W 72/0457; H04W
60/06; H04W 36/0077; H04W 28/0247;
H04W 52/286; H04W 68/025; H04W
52/20; H04W 88/182; H04W 52/262;
H04W 28/0226; H04W 52/265; H04W
52/027; H04W 84/02; H04W 36/324;
H04W 16/12; H04W 16/04; H04W 40/32;
H04W 52/26; H04W 52/225; H04W
36/0027; H04W 12/086; H04W 88/181;
H04W 12/065; H04W 40/10; H04W
52/46; H04W 52/228; H04W 40/244;
H04W 84/22; H04W 8/265; H04W 12/00;
H04W 52/14; H04W 36/16; H04W 52/30;
H04W 68/12; H04W 52/0277; H04W
12/128; H04W 92/14; H04W 40/04;
H04W 4/35; H04W 12/64; H04W 12/009;
H04W 36/0019; H04W 12/68; H04W
12/33; H04W 56/005; H04W 16/20;
H04W 12/108; H04W 36/20; H04W
36/00226; H04W 92/045; H04W 48/17;
H04W 8/14; H04W 16/00; H04W 8/00;
H04W 72/11; H04W 52/58; H04W 12/40;
H04W 74/0875; H04W 36/00224; H04W
52/28; H04W 12/0471; H04W 28/082;
H04W 4/022; H04W 56/004; H04W
74/0891; H04W 84/16; H04W 12/65;
H04W 40/34; H04W 28/0221; H04W
84/00; H04W 36/249; H04W 52/0203;
H04W 88/022; H04W 12/47; H04W
36/008375; H04W 36/00698; H04W
52/322; H04W 4/185; H04W 16/06;
H04W 52/246; H04W 52/0241; H04W
76/32; H04W 76/36; H04W 80/12; H04W
12/30; H04W 72/29; H04W 36/165;
H04W 48/00; H04W 8/10; H04W 52/288;
H04W 36/142; H04W 84/105; H04W
72/1221; H04W 28/0273; H04W 52/248;
H04W 40/28; H04W 52/0232; H04W
52/32; H04W 12/69; H04W 12/75; H04W
60/02; H04W 56/0065; H04W 36/10;
H04W 56/003; H04W 36/34; H04W
52/0238; H04W 80/045; H04W 28/00;
H04W 52/60; H04W 16/16; H04W 16/08;
H04W 12/73; H04W 36/0009; H04W
52/226; H04W 12/121; H04W 52/0264;
H04W 52/221; H04W 56/0025; H04W
36/385; H04W 52/06; H04W 4/23; H04W
88/023; H04W 56/0055; H04W 8/065;
H04W 36/023; H04W 36/005; H04W
92/04; H04W 36/087; H04W 36/00695;
H04W 52/386; H04W 40/08; H04W
52/00; H04W 8/28; H04W 68/04; H04W
28/021; H04W 12/43; H04W 36/0044;
H04W 88/005; H04W 36/083; H04W
40/16; H04W 40/005; H04W 40/30;
H04W 36/28; H04W 74/0825; H04W
12/67; H04W 8/16; H04W 36/00838;
H04W 52/0222; H04W 36/185; H04W
36/085; H04W 92/08; H04W 12/043;
H04W 28/0861; H04W 56/0085; H04W
12/45; H04W 8/30; H04W 52/223; H04W
52/287; H04W 28/0925; H04W 12/80;

H04W 74/0858; H04W 36/13; H04W
88/00; H04W 36/125; H04W 36/033;
H04W 99/00; H04W 28/0257; H04W
72/115; H04W 28/0942; H04W 28/0958;
H04W 28/0967; H04W 40/18; H04W
88/021; H04W 12/48; H04W 8/085;
H04W 28/0865; H04W 52/0296; H04W
52/282; H04W 52/029; H04W 12/79;
H04W 28/088; H04W 56/006; H04W
16/30; H04W 52/22; H04W 52/0267;
H04W 92/06; H04W 92/16; H04W
36/0235; H04W 36/00222; H04W 36/326;
H04W 8/087; H04W 84/022; H04W
92/22; H04W 12/66; H04W 40/06; H04W
40/14; H04W 12/104; H04W 52/327;
H04W 52/56; H04W 68/08; H04W
88/185; H04W 36/026; H04W 12/76;
H04W 36/008357; H04W 56/009; H04W
84/025; H04W 52/0287; H04W 28/086;
H04W 36/03; H04W 12/60; H04W 12/55;
H04W 40/26; H04W 4/203; H04W 12/42;
H04W 2/0242; H04W 68/06; H04W
28/0864; H04W 52/285; H04W 40/023;
H04W 12/102; H04W 92/00; H04W
28/0975; H04W 36/037; H04W 28/09;
H04W 52/0293; H04W 40/38; H04W
52/0283; H04W 36/328; H04W 56/0075;
H04W 28/0983; H04W 40/026; H04W
12/047; H04W 28/084; H04W 72/512;
H04W 36/00725; H04W 36/035; H04W
28/0846; H04W 16/225; H04W 36/247;
H04W 88/026; H04W 28/0862; H04W
12/125; H04W 36/008355; H04W 84/027;
H04W 68/10; H04W 36/00833; H04W
40/125; H04W 28/0875; H04W 72/50;
H04W 88/187; H04W 56/0095; H04W
36/365; H04W 28/0835; H04W 28/0831;
H04W 52/545; H04W 28/0908; H04W
28/0933; H04W 28/0858; H04W 74/0883;
H04M 1/72412; H04M 1/72403; H04M
2250/12; H04M 2250/22; H04M 1/72454;
H04M 1/724; H04M 1/0266; H04M
15/00; H04M 1/0264; H04M 1/026;
H04M 1/04; H04M 7/006; H04M 1/0214;
H04M 1/72436; H04M 1/0268; H04M
1/72469; H04M 2250/52; H04M 1/0202;
H04M 1/0216; H04M 1/23; H04M 1/725;
H04M 1/72457; H04M 1/7243; H04M
3/56; H04M 2250/02; H04M 1/72448;
H04M 1/02; H04M 1/72409; H04M
1/0237; H04M 2207/18; H04M 1/72415;
H04M 3/42; H04M 1/03; H04M 3/533;
H04M 3/493; H04M 3/436; H04M
1/72427; H04M 19/04; H04M 1/22;
H04M 3/42059; H04M 2201/40; H04M
2215/32; H04M 3/42042; H04M 11/062;
H04M 2250/16; H04M 11/04; H04M
1/72445; H04M 2201/38; H04M 1/72406;
H04M 1/0262; H04M 1/57; H04M 15/66;
H04M 1/2535; H04M 11/06; H04M
1/6066; H04M 1/0283; H04M 9/082;
H04M 1/18; H04M 1/0277; H04M 1/185;
H04M 3/54; H04M 1/72451; H04M
1/72463; H04M 11/00; H04M 1/67;
H04M 1/21; H04M 1/72442; H04M

3/567; H04M 1/0235; H04M 2250/10;
H04M 3/51; H04M 3/42221; H04M 1/05;
H04M 1/0245; H04M 2215/2026; H04M
17/00; H04M 1/72439; H04M 2250/74;
H04M 1/24; H04M 3/5175; H04M 15/41;
H04M 1/0249; H04M 1/663; H04M
1/0274; H04M 3/2281; H04M 3/523;
H04M 1/2757; H04M 3/42382; H04M
3/42314; H04M 3/5183; H04M 1/72484;
H04M 1/6041; H04M 3/4931; H04M
15/80; H04M 1/575; H04M 3/5166;
H04M 1/6058; H04M 1/00; H04M
2242/30; H04M 3/5191; H04M 2201/34;
H04M 3/568; H04M 1/72466; H04M
1/6075; H04M 2242/22; H04M 15/58;
H04M 7/12; H04M 1/6091; H04M
2250/60; H04M 2201/60; H04M 2242/04;
H04M 1/022; H04M 3/42102; H04M
3/382; H04M 15/43; H04M 2250/06;
H04M 1/0254; H04M 2250/04; H04M
3/42017; H04M 3/42068; H04M 3/38;
H04M 15/83; H04M 3/4938; H04M
2201/36; H04M 2250/14; H04M 3/42365;
H04M 2250/70; H04M 3/4878; H04M
15/68; H04M 1/0247; H04M 15/8044;
H04M 1/271; H04M 1/27475; H04M
2215/22; H04M 3/42348; H04M 3/42229;
H04M 3/5307; H04M 7/0057; H04M
1/27453; H04M 3/42153; H04M 3/4228;
H04M 3/5116; H04M 15/8083; H04M
1/72433; H04M 1/236; H04M 15/44;
H04M 3/42323; H04M 3/2218; H04M
1/2745; H04M 2201/42; H04M 15/8038;
H04M 1/035; H04M 3/58; H04M 3/36;
H04M 17/02; H04M 2215/0196; H04M
3/487; H04M 1/66; H04M 2215/0164;
H04M 3/5232; H04M 3/4936; H04M
3/02; H04M 15/51; H04M 3/42093;
H04M 3/537; H04M 15/49; H04M 1/56;
H04M 15/8033; H04M 15/88; H04M
2203/2072; H04M 3/22; H04M 3/5233;
H04M 1/72502; H04M 19/047; H04M
15/8016; H04M 7/003; H04M 2203/4536;
H04M 15/56; H04M 1/6505; H04M
15/745; H04M 15/8214; H04M 1/6033;
H04M 7/128; H04M 11/066; H04M
1/72418; H04M 15/06; H04M 15/854;
H04M 15/85; H04M 15/8228; H04M
2250/64; H04M 15/61; H04M 2201/50;
H04M 3/4211; H04M 3/42195; H04M
3/30; H04M 19/08; H04M 3/42374;
H04M 2215/0188; H04M 3/428; H04M
3/42008; H04M 3/53333; H04M 15/28;
H04M 1/6016; H04M 15/64; H04M
15/47; H04M 2215/0108; H04M 11/007;
H04M 1/233; H04M 1/576; H04M
7/1295; H04M 3/527; H04M 2201/18;
H04M 2207/12; H04M 1/2746; H04M
7/0069; H04M 7/00; H04M 3/48; H04M
3/42178; H04M 1/7246; H04M 1/724631;
H04M 3/5322; H04M 2215/0104; H04M
3/42263; H04M 2203/551; H04M 15/55;
H04M 2215/745; H04M 3/5158; H04M
2207/20; H04M 2215/54; H04M 9/08;
H04M 1/72472; H04M 15/62; H04M

7/0027; H04M 2203/2011; H04M
2215/0184; H04M 15/70; H04M 1/0241;
H04M 3/563; H04M 15/08; H04M 1/656;
H04M 1/2748; H04M 1/2747; H04M
3/46; H04M 15/57; H04M 7/0075; H04M
3/42161; H04M 1/60; H04M 19/041;
H04M 2250/18; H04M 2203/2044; H04M
1/0243; H04M 1/27457; H04M 15/765;
H04M 17/20; H04M 2215/42; H04M
1/0218; H04M 11/025; H04M 2201/14;
H04M 2215/46; H04M 1/673; H04M
1/0233; H04M 2215/204; H04M
2215/0152; H04M 1/424098; H04M
7/1205; H04M 15/81; H04M 3/5238;
H04M 2215/0168; H04M 2215/82; H04M
2215/202; H04M 1/73; H04M 1/72421;
H04M 2250/20; H04M 2242/14; H04M
3/465; H04M 3/2236; H04M 1/72505;
H04M 19/048; H04M 3/4872; H04M
1/6008; H04M 1/0279; H04M 15/84;
H04M 11/002; H04M 3/2227; H04M
2215/0192; H04M 7/123; H04M
2203/2066; H04M 15/90; H04M 1/605;
H04M 3/00; H04M 1/247; H04M
2250/62; H04M 1/64; H04M 3/5235;
H04M 7/0024; H04M 15/73; H04M 3/44;
H04M 2215/016; H04M 7/1235; H04M
1/724092; H04M 3/5237; H04M 1/27485;
H04M 1/72424; H04M 15/30; H04M
15/77; H04M 2215/0148; H04M
2203/1091; H04M 2203/6027; H04M
1/0256; H04M 2203/2061; H04M 7/0078;
H04M 7/009; H04M 1/006; H04M
3/2209; H04M 2215/0176; H04M
2203/651; H04M 15/852; H04M 1/0269;
H04M 15/50; H04M 19/02; H04M
2215/0116; H04M 2215/7442; H04M
3/4285; H04M 3/005; H04M 2215/208;
H04M 2203/6045; H04M 3/42357; H04M
1/0272; H04M 7/0036; H04M 1/2473;
H04M 1/2755; H04M 15/48; H04M
15/8055; H04M 7/0072; H04M 11/022;
H04M 2207/203; H04M 3/42204; H04M
3/5141; H04M 2203/2016; H04M 3/4365;
H04M 3/002; H04M 2250/08; H04M
1/0225; H04M 1/6083; H04M 3/53366;
H04M 1/021; H04M 2250/58; H04M
15/60; H04M 17/103; H04M 15/851;
H04M 3/53; H04M 1/0227; H04M 17/10;
H04M 7/125; H04M 2201/41; H04M
2215/62; H04M 2203/558; H04M 1/715;
H04M 15/63; H04M 1/275; H04M
17/026; H04M 1/2478; H04M 2203/2038;
H04M 3/5231; H04M 3/12; H04M
2203/6009; H04M 2215/7435; H04M
15/853; H04M 3/2254; H04M 3/42136;
H04M 3/2272; H04M 15/09; H04M
2250/56; H04M 1/72513; H04M 7/0012;
H04M 2215/34; H04M 3/53308; H04M
2242/15; H04M 2203/4509; H04M
2201/39; H04M 7/126; H04M 1/579;
H04M 1/642; H04M 15/772; H04M
2215/81; H04M 2215/8166; H04M 3/007;
H04M 1/0212; H04M 1/82; H04M 3/565;
H04M 3/561; H04M 2215/7254; H04M

1/19; H04M 7/0033; H04M 15/7652; H04M 2203/301; H04M 2203/6054; H04M 9/001; H04M 2215/2046; H04M 1/2749; H04M 3/306; H04M 1/27; H04M 2203/253; H04M 2207/206; H04M 2215/724; H04M 2203/2094; H04M 3/42051; H04M 1/675; H04M 1/11; H04M 3/569; H04M 1/677; H04M 15/7655; H04M 3/4234; H04M 1/65; H04M 2203/355; H04M 2203/652; H04M 3/5133; H04M 3/42391; H04M 3/53325; H04M 19/001; H04M 2203/5063; H04M 2215/44; H04M 15/53; H04M 2215/0112; H04M 2203/205; H04M 2203/402; H04M 2203/5054; H04M 3/50; H04M 3/18; H04M 3/562; H04M 3/5125; H04M 2203/556; H04M 15/31; H04M 2215/7263; H04M 2215/725; H04M 3/304; H04M 2203/6081; H04M 2215/7072; H04M 1/0208; H04M 3/53383; H04M 17/204; H04M 15/59; H04M 11/10; H04M 2215/815; H04M 2203/655; H04M 17/023; H04M 19/005; H04M 7/0054; H04M 2215/7414; H04M 1/0252; H04M 15/65; H04M 11/08; H04M 1/0281; H04M 2250/66; H04M 15/07; H04M 2215/0156; H04M 15/785; H04M 7/1245; H04M 3/08; H04M 3/16; H04M 3/42297; H04M 1/2477; H04M 1/253; H04M 11/085; H04M 2215/8129; H04M 2215/52; H04M 15/844; H04M 3/4217; H04M 7/0084; H04M 9/00; H04M 1/724634; H04M 1/667; H04M 2215/782; H04M 3/4935; H04M 3/564; H04M 7/1285; H04M 2203/5018; H04M 2215/74; H04M 15/8022; H04M 2203/5009; H04M 1/15; H04M 2203/401; H04M 7/1255; H04M 7/0045; H04M 1/0206; H04M 15/8351; H04M 3/42144; H04M 3/546; H04M 3/432; H04M 2215/0172; H04M 1/0258; H04M 15/8207; H04M 15/67; H04M 2215/70; H04M 2201/12; H04M 1/724095; H04M 15/8027; H04M 2203/609; H04M 19/00; H04M 1/26; H04M 3/34; H04M 15/8292; H04M 1/733; H04M 1/72478; H04M 3/387; H04M 3/323; H04M 1/738; H04M 3/367; H04M 11/045; H04M 3/42306; H04M 3/28; H04M 1/665; H04M 2215/28; H04M 3/42272; H04M 3/20; H04M 2215/7833; H04M 2203/2027; H04M 15/705; H04M 3/566; H04M 3/42289; H04M 2215/018; H04M 2215/92; H04M 3/4288; H04M 1/0222; H04M 3/301; H04M 2250/68; H04M 7/122; H04M 15/82; H04M 15/46; H04M 2017/12; H04M 2203/2005; H04M 1/737; H04M 3/543; H04M 1/06; H04M 7/0042; H04M 2203/353; H04M 1/27463; H04M 1/0291; H04M 1/727; H04M 11/068; H04M 2203/5027; H04M 2215/2013; H04M 1/724094; H04M 9/02; H04M 19/042; H04M 3/4283; H04M 15/805; H04M 1/0239; H04M 2203/554; H04M 2203/2088; H04M 3/305; H04M 1/72481; H04M 1/72475; H04M 2203/6018; H04M 2203/654; H04M 3/42246; H04M 2215/7813; H04M 15/775; H04M 15/888; H04M 1/652; H04M 15/52; H04M 3/229; H04M 15/72; H04M 2215/96; H04M 17/106; H04M 2203/254; H04M 3/40; H04M 7/129; H04M 2215/2033; H04M 1/724097; H04M 3/2263; H04M 7/0048; H04M 7/0066; H04M 2203/357; H04M 7/0063; H04M 7/0093; H04M 15/10; H04M 2017/24; H04M 15/773; H04M 1/62; H04M 7/127; H04M 2215/64; H04M 2203/053; H04M 3/10; H04M 3/5335; H04M 7/1225; H04M 2203/252; H04M 1/72511; H04M 2203/1016; H04M 1/573; H04M 3/53375; H04M 1/0297; H04M 3/42127; H04M 9/002; H04M 1/17; H04M 19/045; H04M 3/4933; H04M 7/0015; H04M 1/68; H04M 1/08; H04M 7/0081; H04M 2201/16; H04M 2203/105; H04M 2201/22; H04M 2215/48; H04M 3/424; H04M 1/72516; H04M 7/06; H04M 1/658; H04M 15/74; H04M 2215/66; H04M 1/274; H04M 2215/7268; H04M 2017/14; H04M 9/085; H04M 3/42187; H04M 15/8061; H04M 3/5315; H04M 5/06; H04M 3/385; H04M 1/571; H04M 2203/408; H04M 2203/256; H04M 1/2475; H04M 2215/7245; H04M 7/0039; H04M 15/835; H04M 1/0231; H04M 1/2155; H04M 15/755; H04M 3/60; H04M 3/53341; H04M 1/215; H04M 3/42238; H04M 1/2472; H04M 1/2471; H04M 15/8221; H04M 1/0293; H04M 2207/185; H04M 3/24; H04M 15/39; H04M 2203/2083; H04M 3/53316; H04M 15/846; H04M 2215/8108; H04M 7/0096; H04M 2203/352; H04M 3/4281; H04M 7/0006; H04M 3/244; H04M 1/6025; H04M 19/026; H04M 2203/1058; H04M 2203/5072; H04M 3/085; H04M 2207/08; H04M 7/0009; H04M 1/6775; H04M 19/044; H04M 3/53358; H04M 15/04; H04M 15/93; H04M 2203/303; H04M 2203/306; H04M 7/1275; H04M 3/26; H04M 2242/12; H04M 3/303; H04M 15/725; H04M 2215/56; H04M 1/12; H04M 7/0051; H04M 11/02; H04M 3/5234; H04M 1/27467; H04M 7/0021; H04M 3/42034; H04M 15/882; H04M 3/53391; H04M 15/858; H04M 2203/1008; H04M 19/008; H04M 2215/7457; H04M 15/715; H04M 15/75; H04M 7/0003; H04M 2215/7277; H04M 9/025; H04M 1/2474; H04M 7/121; H04M 2215/8162; H04M 1/745; H04M 15/857; H04M 2203/60; H04M 15/8011; H04M 2203/305; H04M 1/50; H04M 2203/555; H04M 9/005; H04M 1/2753; H04M 1/654; H04M 15/8005; H04M 2215/78; H04M 3/42212; H04M 2203/4563; H04M 2203/6072; H04M 1/0295; H04M 3/548; H04M 2201/52; H04M 2215/14; H04M 2242/06; H04M 15/7556; H04M 15/42; H04M 1/027;

H04M 3/4874; H04M 2215/7009; H04M 2250/54; H04L 67/12; H04L 5/0053; H04L 5/0048; H04L 67/02; H04L 67/10; H04L 63/08; H04L 63/0428; H04L 5/0007; H04L 5/001; H04L 5/0094; H04L 67/1097; H04L 9/3247; H04L 9/40; H04L 5/0055; H04L 63/10; H04L 63/20; H04L 5/0023; H04L 5/0044; H04L 69/329; H04L 1/1812; H04L 67/306; H04L 5/0051; H04L 9/50; H04L 69/22; H04L 67/06; H04L 67/34; H04L 63/083; H04L 67/52; H04L 1/0026; H04L 63/1416; H04L 65/80; H04L 67/125; H04L 67/1095; H04L 63/0823; H04L 67/51; H04L 65/1069; H04L 47/10; H04L 63/1425; H04L 63/102; H04L 12/66; H04L 41/12; H04L 5/0091; H04L 63/0876; H04L 1/0003; H04L 51/04; H04L 67/55; H04L 67/535; H04L 1/08; H04L 9/3239; H04L 1/0057; H04L 63/0853; H04L 1/0009; H04L 1/0071; H04L 43/16; H04L 1/1854; H04L 67/14; H04L 67/025; H04L 5/14; H04L 63/1441; H04L 67/04; H04L 1/0041; H04L 67/141; H04L 43/50; H04L 12/4641; H04L 1/1861; H04L 63/0861; H04L 2209/56; H04L 69/16; H04L 5/0057; H04L 27/2602; H04L 5/005; H04L 63/123; H04L 45/02; H04L 67/568; H04L 27/2613; H04L 65/1016; H04L 63/101; H04L 2209/80; H04L 1/1887; H04L 41/0806; H04L 65/403; H04L 45/00; H04L 41/22; H04L 9/0643; H04L 65/1104; H04L 67/104; H04L 12/4633; H04L 41/0803; H04L 1/0061; H04L 65/612; H04L 63/1408; H04L 43/0817; H04L 69/08; H04L 9/32; H04L 9/3263; H04L 63/1433; H04L 43/10; H04L 61/4511; H04L 1/1896; H04L 41/145; H04L 43/08; H04L 9/14; H04L 67/56; H04L 5/0035; H04L 5/0092; H04L 5/00; H04L 9/3236; H04L 41/0893; H04L 45/28; H04L 1/00; H04L 63/12; H04L 67/1001; H04L 65/1101; H04L 9/0869; H04L 12/28; H04L 9/0861; H04L 63/0442; H04L 67/01; H04L 9/0825; H04L 45/22; H04L 69/40; H04L 51/52; H04L 67/60; H04L 1/0045; H04L 9/0894; H04L 63/0272; H04L 63/105; H04L 5/0037; H04L 9/3226; H04L 45/74; H04L 1/1819; H04L 1/1671; H04L 27/2647; H04L 63/0807; H04L 47/70; H04L 12/2803; H04L 47/125; H04L 51/046; H04L 5/0064; H04L 69/18; H04L 51/58; H04L 25/0204; H04L 12/189; H04L 5/006; H04L 65/70; H04L 63/06; H04L 43/0811; H04L 9/0891; H04L 63/061; H04L 2012/40215; H04L 65/65; H04L 5/1469; H04L 65/611; H04L 61/5007; H04L 1/18; H04L 67/63; H04L 27/2601; H04L 25/0224; H04L 1/1607; H04L 1/0025; H04L 63/062; H04L 63/0815; H04L 43/0876; H04L 63/126; H04L 67/303; H04L 41/40; H04L 2012/40273; H04L 27/26; H04L 12/40; H04L 5/0098; H04L 9/0866; H04L 43/0852; H04L 43/00; H04L 5/0073; H04L 67/565; H04L 12/6418; H04L 63/18; H04L 67/1008; H04L 63/0236; H04L 9/30; H04L 69/04; H04L 41/082; H04L 45/50; H04L 12/12; H04L 45/24; H04L 12/14; H04L 45/04; H04L 49/90; H04L 63/0435; H04L 63/145; H04L 9/3271; H04L 1/20; H04L 51/10; H04L 9/0637; H04L 1/1864; H04L 41/0816; H04L 69/324; H04L 41/0631; H04L 41/16; H04L 41/0894; H04L 9/3213; H04L 1/1822; H04L 9/3231; H04L 47/2441; H04L 9/3242; H04L 63/0227; H04L 61/00; H04L 67/131; H04L 1/06; H04L 27/2607; H04L 2101/622; H04L 47/24; H04L 51/212; H04L 25/0226; H04L 41/0896; H04L 41/0895; H04L 69/24; H04L 45/745; H04L 41/0213; H04L 69/14; H04L 12/18; H04L 2201/0093; H04L 43/04; H04L 1/0002; H04L 9/3234; H04L 65/762; H04L 63/1466; H04L 12/10; H04L 9/085; H04L 41/06; H04L 63/1458; H04L 63/104; H04L 12/4625; H04L 9/0822; H04L 65/60; H04L 12/282; H04L 63/107; H04L 63/02; H04L 25/03343; H04L 63/0281; H04L 61/5014; H04L 9/3268; H04L 65/1073; H04L 1/0072; H04L 9/3297; H04L 27/26025; H04L 51/214; H04L 47/32; H04L 41/00; H04L 65/40; H04L 9/321; H04L 45/16; H04L 67/53; H04L 63/0869; H04L 51/02; H04L 41/142; H04L 5/003; H04L 67/146; H04L 2209/805; H04L 43/0829; H04L 63/166; H04L 67/54; H04L 27/261; H04L 47/12; H04L 65/765; H04L 1/1893; H04L 67/30; H04L 67/75; H04L 41/147; H04L 12/185; H04L 1/1614; H04L 12/1822; H04L 61/103; H04L 2209/60; H04L 27/2657; H04L 63/0263; H04L 67/563; H04L 45/64; H04L 5/0032; H04L 5/0005; H04L 69/28; H04L 1/16; H04L 12/403; H04L 51/18; H04L 41/046; H04L 41/5009; H04L 67/61; H04L 51/066; H04L 41/0654; H04L 43/045; H04L 47/20; H04L 1/0027; H04L 12/5601; H04L 41/069; H04L 45/38; H04L 63/0884; H04L 47/30; H04L 51/224; H04L 7/033; H04L 43/12; H04L 2012/2841; H04L 2463/101; H04L 63/205; H04L 63/168; H04L 41/0677; H04L 69/161; H04L 51/42; H04L 27/2626; H04L 9/0819; H04L 9/083; H04L 47/283; H04L 1/0083; H04L 67/62; H04L 41/0813; H04L 41/0668; H04L 63/0892; H04L 9/088; H04L 9/08; H04L 69/163; H04L 27/0008; H04L 1/0054; H04L 5/0082; H04L 27/34; H04L 47/805; H04L 1/0068; H04L 47/50; H04L 1/004; H04L 47/11; H04L 2012/2849; H04L 27/2675; H04L 47/34; H04L 12/2816; H04L 5/0046; H04L 45/54; H04L 2209/84; H04L 51/216; H04L 43/0894; H04L 41/0853; H04L 5/0016; H04L 2209/12; H04L 25/0202; H04L 9/0852; H04L 1/0001; H04L 45/42;

H04L 65/1083; H04L 41/0823; H04L
12/46; H04L 9/0897; H04L 63/0838;
H04L 9/0838; H04L 47/2416; H04L
1/0065; H04L 47/15; H04L 63/029; H04L
27/0006; H04L 27/2662; H04L 65/61;
H04L 63/108; H04L 45/5054; H04L
12/413; H04L 27/0014; H04L 47/822;
H04L 51/48; H04L 2012/285; H04L
1/188; H04L 12/2801; H04L 9/008; H04L
9/0631; H04L 7/0008; H04L 1/189; H04L
49/351; H04L 51/08; H04L 63/04; H04L
12/2856; H04L 9/0618; H04L 41/0886;
H04L 1/0059; H04L 25/0228; H04L
41/0663; H04L 27/2614; H04L 51/00;
H04L 63/1483; H04L 61/5038; H04L
49/25; H04L 43/0882; H04L 5/0078;
H04L 69/32; H04L 43/0864; H04L
9/3228; H04L 2001/0097; H04L 1/1685;
H04L 12/2809; H04L 65/613; H04L
12/40006; H04L 1/1867; H04L 1/1825;
H04L 49/30; H04L 43/0888; H04L
25/0272; H04L 12/1827; H04L 45/12;
H04L 1/22; H04L 12/1818; H04L
61/2514; H04L 43/106; H04L 43/026;
H04L 5/0096; H04L 2025/03426; H04L
45/306; H04L 47/28; H04L 9/3066; H04L
63/164; H04L 5/0012; H04L 65/75; H04L
43/20; H04L 12/2818; H04L 65/103;
H04L 12/1407; H04L 12/437; H04L
5/023; H04L 63/14; H04L 1/0007; H04L
41/14; H04L 5/0058; H04L 43/028; H04L
43/0823; H04L 1/005; H04L 12/40013;
H04L 27/2636; H04L 1/0015; H04L
49/70; H04L 1/007; H04L 65/1043; H04L
63/0209; H04L 47/2433; H04L 65/752;
H04L 67/564; H04L 45/48; H04L 51/56;
H04L 45/586; H04L 43/062; H04L 43/06;
H04L 49/3009; H04L 65/104; H04L
1/038; H04L 25/03057; H04L 12/44;
H04L 1/0066; H04L 12/1403; H04L
1/0028; H04L 9/12; H04L 65/764; H04L
25/022; H04L 45/66; H04L 65/00; H04L
2025/03414; H04L 63/0407; H04L
2209/24; H04L 2463/102; H04L 27/2627;
H04L 67/142; H04L 41/08; H04L 1/1874;
H04L 67/561; H04L 1/1809; H04L
47/824; H04L 2463/082; H04L 25/0212;
H04L 47/29; H04L 45/245; H04L
12/1813; H04L 9/0863; H04L 43/065;
H04L 41/5003; H04L 65/4061; H04L
63/0421; H04L 1/0006; H04L 65/4015;
H04L 1/1845; H04L 27/38; H04L 47/22;
H04L 45/302; H04L 2212/00; H04L
12/2807; H04L 63/0245; H04L 9/3273;
H04L 9/00; H04L 41/28; H04L 67/5682;
H04L 25/03159; H04L 47/25; H04L
51/222; H04L 69/162; H04L 12/56; H04L
9/0844; H04L 12/42; H04L 27/2655;
H04L 65/1096; H04L 25/4902; H04L
27/2605; H04L 9/0662; H04L 5/0062;
H04L 47/2483; H04L 1/1835; H04L
47/2408; H04L 47/83; H04L 9/3278;
H04L 25/02; H04L 67/1004; H04L
12/40032; H04L 1/1848; H04L 25/03866;
H04L 45/123; H04L 7/042; H04L 45/34;
H04L 25/03006; H04L 9/002; H04L
1/0618; H04L 1/203; H04L 1/0013; H04L
51/043; H04L 63/068; H04L 61/10; H04L
63/162; H04L 47/263; H04L 45/60; H04L
47/193; H04L 41/5019; H04L 9/0841;
H04L 63/0492; H04L 61/30; H04L
1/1858; H04L 1/0031; H04L 27/2666;
H04L 5/16; H04L 27/2656; H04L 5/0042;
H04L 2209/08; H04L 1/1829; H04L
41/122; H04L 43/18; H04L 9/0877; H04L
67/101; H04L 5/0026; H04L 49/3081;
H04L 7/0331; H04L 47/27; H04L 67/08;
H04L 1/0042; H04L 2209/603; H04L
1/0067; H04L 1/0029; H04L 45/70; H04L
63/065; H04L 12/462; H04L 49/15; H04L
49/901; H04L 67/148; H04L 9/3073;
H04L 12/5602; H04L 27/18; H04L
49/254; H04L 67/1029; H04L 63/045;
H04L 12/1859; H04L 27/22; H04L
12/2834; H04L 43/087; H04L 12/5692;
H04L 12/2838; H04L 27/04; H04L
67/5651; H04L 65/756; H04L 9/3218;
H04L 25/14; H04L 41/0681; H04L
67/289; H04L 12/2825; H04L 5/0041;
H04L 69/323; H04L 67/562; H04L
41/5025; H04L 1/0075; H04L 25/067;
H04L 1/1664; H04L 12/00; H04L 1/0047;
H04L 27/00; H04L 5/0039; H04L 51/063;
H04L 45/7453; H04L 2209/34; H04L
27/02; H04L 67/1023; H04L 1/0046;
H04L 27/2603; H04L 5/06; H04L 67/133;
H04L 27/0012; H04L 45/26; H04L
67/566; H04L 65/1094; H04L 41/50;
H04L 2209/42; H04L 12/2814; H04L
65/4038; H04L 69/164; H04L 12/1886;
H04L 65/1063; H04L 1/0058; H04L
9/003; H04L 25/028; H04L 51/23; H04L
1/24; H04L 47/6215; H04L 69/26; H04L
67/1034; H04L 1/1621; H04L 47/724;
H04L 67/145; H04L 27/36; H04L 69/321;
H04L 47/6275; H04L 41/5051; H04L
43/0847; H04L 63/1491; H04L 61/35;
H04L 25/03038; H04L 1/0023; H04L
25/0242; H04L 12/2898; H04L 2463/062;
H04L 65/1066; H04L 45/125; H04L
45/20; H04L 1/0017; H04L 41/5096;
H04L 47/762; H04L 27/2646; H04L
2101/604; H04L 65/1059; H04L 7/04;
H04L 51/234; H04L 9/006; H04L
65/1045; H04L 61/50; H04L 2463/061;
H04L 41/044; H04L 43/0805; H04L
41/0866; H04L 2012/563; H04L 1/0073;
H04L 67/5681; H04L 25/0278; H04L
67/567; H04L 2012/5652; H04L 1/0016;
H04L 61/2503; H04L 7/00; H04L 9/06;
H04L 47/781; H04L 1/1816; H04L
49/354; H04L 61/45; H04L 12/40117;
H04L 9/0833; H04L 12/2805; H04L
2012/4026; H04L 67/00; H04L 7/041;
H04L 47/122; H04L 12/1831; H04L
2012/5651; H04L 69/326; H04L
2001/0092; H04L 7/0337; H04L 25/0232;
H04L 27/3488; H04L 9/0625; H04L
27/06; H04L 65/1095; H04L 12/40169;
H04L 2012/5679; H04L 12/2823; H04L

2101/659; H04L 12/1895; H04L 49/201;
H04L 65/1046; H04L 63/00; H04L
67/1021; H04L 1/006; H04L 27/26134;
H04L 9/302; H04L 63/30; H04L 9/065;
H04L 69/06; H04L 2012/5681; H04L
45/124; H04L 27/20; H04L 12/2827;
H04L 12/40045; H04L 41/0856; H04L
69/12; H04L 67/1012; H04L 67/59; H04L
67/1044; H04L 41/04; H04L 9/0816;
H04L 45/122; H04L 47/36; H04L 45/121;
H04L 63/0846; H04L 43/0858; H04L
9/3265; H04L 27/2628; H04L 1/0079;
H04L 41/0233; H04L 2209/16; H04L
25/49; H04L 25/03; H04L 2209/46; H04L
27/2695; H04L 9/0858; H04L 65/1089;
H04L 41/5067; H04L 27/01; H04L
47/801; H04L 41/0843; H04L 67/1014;
H04L 1/0052; H04L 25/4904; H04L
2012/5672; H04L 27/2692; H04L 7/10;
H04L 69/03; H04L 41/0659; H04L
25/0292; H04L 27/265; H04L 5/1438;
H04L 25/03834; H04L 47/2475; H04L
51/226; H04L 41/5041; H04L 49/101;
H04L 47/26; H04L 41/0869; H04L
1/0069; H04L 25/03019; H04L 2001/125;
H04L 27/368; H04L 65/401; H04L
65/1093; H04L 45/742; H04L 61/5092;
H04L 9/001; H04L 41/042; H04L 47/825;
H04L 27/12; H04L 12/1881; H04L
61/5046; H04L 1/0014; H04L 2463/121;
H04L 27/26132; H04L 2012/5632; H04L
41/0686; H04L 47/41; H04L 2027/0067;
H04L 61/5076; H04L 7/02; H04L
63/0485; H04L 2001/0098; H04L 5/22;
H04L 41/0897; H04L 5/0085; H04L
12/2812; H04L 5/143; H04L 45/44; H04L
1/0625; H04L 25/0266; H04L 1/04; H04L
67/108; H04L 43/067; H04L 27/14; H04L
2209/76; H04L 45/14; H04L 25/4917;
H04L 47/72; H04L 41/5022; H04L
12/1868; H04L 63/0464; H04L 27/2634;
H04L 12/417; H04L 9/3252; H04L
27/2649; H04L 25/08; H04L 9/0836;
H04L 12/2854; H04L 49/552; H04L
12/64; H04L 27/10; H04L 45/18; H04L
49/40; H04L 9/3215; H04L 9/3255; H04L
27/3405; H04L 61/5084; H04L 65/1036;
H04L 2209/125; H04L 63/0478; H04L
61/5061; H04L 27/2332; H04L 61/5069;
H04L 63/0218; H04L 12/1877; H04L
1/0036; H04L 63/306; H04L 47/56; H04L
61/256; H04L 69/167; H04L 49/205;
H04L 47/803; H04L 61/2592; H04L
27/362; H04L 65/1026; H04L 63/0471;
H04L 69/166; H04L 61/4541; H04L
61/4557; H04L 7/0075; H04L 1/181;
H04L 9/16; H04L 67/1031; H04L
49/9057; H04L 12/1485; H04L 25/061;
H04L 1/003; H04L 7/027; H04L
2012/5627; H04L 47/808; H04L 41/0253;
H04L 1/1642; H04L 69/325; H04L
12/4645; H04L 25/03885; H04L
2027/003; H04L 47/31; H04L 2207/0026;
H04L 25/0222; H04L 49/10; H04L
7/0083; H04L 67/143; H04L 616/4552;
H04L 12/281; H04L 1/0004; H04L
47/2425; H04L 63/0414; H04L 5/0028;
H04L 5/0087; H04L 41/0604; H04L
2001/0096; H04L 1/1877; H04L 41/0226;
H04L 47/826; H04L 9/3249; H04L
45/741; H04L 5/1461; H04L 47/38; H04L
67/1046; H04L 41/20; H04L 41/0889;
H04L 45/30; H04L 47/745; H04L 9/0656;
H04L 41/509; H04L 27/26136; H04L
49/253; H04L 41/0661; H04L 1/02; H04L
2101/668; H04L 69/168; H04L 1/0048;
H04L 1/1692; H04L 61/106; H04L
41/342; H04L 1/187; H04L 2012/5636;
H04L 7/08; H04L 47/215; H04L 45/46;
H04L 25/497; H04L 1/1628; H04L
65/1106; H04L 2012/5616; H04L
2101/69; H04L 12/1836; H04L 45/021;
H04L 45/72; H04L 47/783; H04L 49/109;
H04L 67/288; H04L 12/40039; H04L
47/765; H04L 2025/03802; H04L 5/0069;
H04L 1/1635; H04L 43/022; H04L 1/001;
H04L 61/2517; H04L 2209/88; H04L
63/0457; H04L 47/18; H04L 67/10015;
H04L 41/0846; H04L 61/4535; H04L
41/0836; H04L 9/0872; H04L 12/2836;
H04L 41/065; H04L 2209/127; H04L
49/557; H04L 47/76; H04L 9/0827; H04L
49/357; H04L 69/165; H04L 67/1063;
H04L 12/40058; H04L 61/2575; H04L
1/0018; H04L 2012/5607; H04L 41/083;
H04L 63/067; H04L 2012/5619; H04L
45/308; H04L 2209/04; H04L 49/555;
H04L 63/0254; H04L 12/22; H04L
41/0809; H04L 41/085; H04L 5/0021;
H04L 2209/601; H04L 45/507; H04L
1/0643; H04L 67/1074; H04L 12/2832;
H04L 1/0606; H04L 47/365; H04L
49/9094; H04L 43/14; H04L 45/566;
H04L 12/2829; H04L 12/4135; H04L
9/3093; H04L 1/0631; H04L 67/1068;
H04L 2012/2843; H04L 49/3027; H04L
7/0087; H04L 7/046; H04L 43/55; H04L
47/2491; H04L 41/0873; H04L 65/102;
H04L 61/25; H04L 47/2458; H04L 41/34;
H04L 27/26035; H04L 1/0076; H04L
2027/0065; H04L 67/1065; H04L
2209/30; H04L 45/52; H04L 67/1078;
H04L 45/03; H04L 27/2665; H04L
25/03878; H04L 12/4604; H04L 41/5058;
H04L 12/16; H04L 1/0063; H04L 49/602;
H04L 49/3018; H04L 12/1467; H04L
47/621; H04L 25/0248; H04L 2012/5615;
H04L 43/091; H04L 5/10; H04L 1/0008;
H04L 41/5032; H04L 45/033; H04L
41/064; H04L 47/245; H04L 49/9047;
H04L 7/0037; H04L 25/03891; H04L
12/1854; H04L 61/251; H04L 49/255;
H04L 27/2678; H04L 12/4035; H04L
27/266; H04L 1/0056; H04L 12/283;
H04L 2025/0349; H04L 61/2564; H04L
67/1091; H04L 1/0078; H04L 2463/144;
H04L 2027/0057; H04L 61/58; H04L
1/1803; H04L 12/433; H04L 41/344;
H04L 1/0043; H04L 12/1863; H04L
69/322; H04L 2012/561; H04L 27/2663;

H04L 2012/5649; H04L 41/024; H04L
61/5053; H04L 7/0016; H04L 49/35;
H04L 1/206; H04L 5/0033; H04L 61/59;
H04L 27/2691; H04L 1/0021; H04L
27/2659; H04L 47/17; H04L 61/4588;
H04L 7/0029; H04L 12/4013; H04L
7/048; H04L 27/364; H04L 47/19; H04L
1/0668; H04L 1/0039; H04L 41/0246;
H04L 41/149; H04L 61/301; H04L
1/1657; H04L 47/6255; H04L 12/40071;
H04L 41/5087; H04L 47/43; H04L
7/0334; H04L 45/32; H04L 49/309; H04L
45/10; H04L 49/103; H04L 2012/6481;
H04L 45/08; H04L 47/39; H04L 27/3411;
H04L 2209/046; H04L 47/127; H04L
27/0002; H04L 67/1093; H04L 41/0876;
H04L 12/4675; H04L 65/1053; H04L
2209/20; H04L 45/76; H04L 7/0012;
H04L 41/0883; H04L 12/1435; H04L
2209/463; H04L 41/022; H04L 69/085;
H04L 45/026; H04L 2101/663; H04L
27/3416; H04L 1/0019; H04L 67/1036;
H04L 2209/608; H04L 47/13; H04L
25/024; H04L 47/33; H04L 12/2859;
H04L 49/00; H04L 43/02; H04L
25/03012; H04L 47/806; H04L 1/1832;
H04L 69/169; H04L 12/1439; H04L
67/2895; H04L 47/80; H04L 27/2621;
H04L 67/2871; H04L 61/2553; H04L
51/06; H04L 41/0833; H04L 12/40019;
H04L 45/62; H04L 47/828; H04L
25/03178; H04L 47/266; H04L 2209/72;
H04L 7/0079; H04L 2209/122; H04L
25/0262; H04L 47/6225; H04L 41/0695;
H04L 12/40182; H04L 41/5029; H04L
2027/0016; H04L 2101/65; H04L 5/026;
H04L 47/82; H04L 69/00; H04L
2463/146; H04L 2012/4028; H04L
47/821; H04L 67/1076; H04L 27/262;
H04L 2101/654; H04L 1/1883; H04L
45/247; H04L 9/3221; H04L 25/4908;
H04L 5/1446; H04L 65/1033; H04L
45/58; H04L 25/0216; H04L 25/03898;
H04L 67/1061; H04L 7/0091; H04L
61/2596; H04L 9/3013; H04L 49/20;
H04L 2012/5665; H04L 41/0266; H04L
27/2697; H04L 61/4594; H04L
2012/2845; H04L 2027/0053; H04L
67/147; H04L 7/0025; H04L 47/78; H04L
63/16; H04L 27/2273; H04L 12/1845;
H04L 25/085; H04L 2012/5667; H04L
41/5006; H04L 2012/5625; H04L 7/0054;
H04L 41/24; H04L 67/5683; H04L
25/025; H04L 5/0066; H04L 12/40078;
H04L 12/2861; H04L 9/0847; H04L
2001/0094; H04L 1/0005; H04L
45/74591; H04L 49/1553; H04L
2027/0095; H04L 1/0034; H04L 5/0083;
H04L 7/06; H04L 1/0077; H04L 2209/26;
H04L 41/5048; H04L 2012/5674; H04L
27/2672; H04L 2025/03617; H04L
25/03821; H04L 1/009; H04L 25/03318;
H04L 65/1076; H04L 67/1051; H04L
49/50; H04L 47/35; H04L 67/1027; H04L
41/0859; H04L 41/18; H04L 5/1423;

H04L 25/03171; H04L 47/52; H04L
25/0256; H04L 27/2604; H04L
2012/40241; H04L 49/9005; H04L 9/304;
H04L 12/02; H04L 49/252; H04L
2012/5671; H04L 9/004; H04L 25/03828;
H04L 43/0835; H04L 2012/5635; H04L
1/205; H04L 5/02; H04L 61/2567; H04L
1/0011; H04L 27/2615; H04L 2012/5647;
H04L 2463/103; H04L 27/3863; H04L
41/5045; H04L 7/0041; H04L 27/183;
H04L 5/0025; H04L 49/106; H04L
67/2876; H04L 12/2874; H04L
2025/0342; H04L 25/06; H04L 1/1838;
H04L 47/788; H04L 27/26524; H04L
27/361; H04L 2012/5656; H04L 27/32;
H04L 61/255; H04L 7/0062; H04L
12/40052; H04L 1/1678; H04L 63/1475;
H04L 45/028; H04L 12/407; H04L
41/0826; H04L 12/1432; H04L
2025/03522; H04L 25/0236; H04L
67/1017; H04L 1/242; H04L 43/103;
H04L 1/0675; H04L 12/43; H04L
25/03305; H04L 47/323; H04L 61/3015;
H04L 1/1851; H04L 49/203; H04L
7/0004; H04L 45/3065; H04L 2012/562;
H04L 47/115; H04L 25/062; H04L
12/2821; H04L 27/26526; H04L
2025/03477; H04L 67/1042; H04L
25/021; H04L 25/0298; H04L 47/225;
H04L 2101/30; H04L 2027/0055; H04L
49/9042; H04L 12/40143; H04L
2012/5618; H04L 27/2017; H04L
2012/5603; H04L 49/45; H04L 1/0035;
H04L 2012/40234; H04L 2012/6472;
H04L 12/40176; H04L 2101/677; H04L
27/206; H04L 67/2885; H04L 49/1515;
H04L 1/0032; H04L 27/2623; H04L
41/5064; H04L 2025/03808; H04L
27/2618; H04L 49/108; H04L 41/5074;
H04L 47/623; H04L 61/3025; H04L
9/0855; H04L 25/0276; H04L 49/9063;
H04L 25/00; H04L 1/201; H04L 67/1048;
H04L 45/56; H04L 41/0273; H04L 23/02;
H04L 27/156; H04L 47/782; H04L
65/1023; H04L 1/1806; H04L 25/4906;
H04L 25/03292; H04L 1/0084; H04L
45/68; H04L 1/0053; H04L 12/4637;
H04L 5/0001; H04L 47/827; H04L
61/2557; H04L 2027/0028; H04L 28/023;
H04L 25/0282; H04L 25/03331; H04L
41/5077; H04L 27/2676; H04L 49/256;
H04L 1/0656; H04L 1/12; H04L
25/03146; H04L 41/5012; H04L 47/829;
H04L 7/0338; H04L 49/55; H04L
2012/5626; H04L 27/2637; H04L 1/0055;
H04L 2027/0046; H04L 61/2589; H04L
49/9078; H04L 2012/5642; H04L
27/2671; H04L 27/3809; H04L 45/748;
H04L 2012/5638; H04L 2012/6475;
H04L 25/03267; H04L 67/1059; H04L
12/4015; H04L 12/40104; H04L 41/30;
H04L 1/0064; H04L 1/0091; H04L
27/366; H04L 61/2521; H04L 65/4046;
H04L 12/40065; H04L 69/02; H04L
25/0254; H04L 2012/5605; H04L

25/03949; H04L 41/084; H04L 49/111;
H04L 65/4025; H04L 41/052; H04L
49/102; H04L 2012/40228; H04L
49/1523; H04L 12/1471; H04L 25/0328;
H04L 1/0086; H04L 47/2466; H04L
41/026; H04L 27/2071; H04L 47/746;
H04L 25/063; H04L 25/05; H04L
2209/605; H04L 67/1038; H04L 1/0693;
H04L 41/32; H04L 63/308; H04L 27/367;
H04L 41/5061; H04L 27/3854; H04L
12/1457; H04L 2463/141; H04L 7/044;
H04L 9/3033; H04L 61/2528; H04L
47/564; H04L 41/0879; H04L 2012/568;
H04L 27/3483; H04L 69/10; H04L
45/127; H04L 12/2885; H04L 12/40091;
H04L 25/20; H04L 45/243; H04L
25/0264; H04L 49/352; H04L 61/4547;
H04L 12/4608; H04L 2027/0036; H04L
27/2679; H04L 47/626; H04L
2025/03375; H04L 12/467; H04L
25/0246; H04L 12/1428; H04L 1/208;
H04L 61/4523; H04L 2012/5682; H04L
49/65; H04L 1/008; H04L 1/243; H04L
41/0609; H04L 25/0244; H04L 27/26265;
H04L 12/4679; H04L 12/40189; H04L
65/1086; H04L 61/2535; H04L
2027/0024; H04L 2012/6486; H04L
2101/686; H04L 12/423; H04L 2101/35;
H04L 63/302; H04L 47/16; H04L 47/286;
H04L 49/3045; H04L 7/005; H04L
49/3063; H04L 69/327; H04L 27/227;
H04L 2012/5628; H04L 43/024; H04L
45/036; H04L 67/1025; H04L 47/748;
H04L 49/356; H04L 47/00; H04L
41/0863; H04L 1/0051; H04L 47/527;
H04L 12/1453; H04L 12/1425; H04L
2012/6459; H04L 12/2869; H04L
27/2688; H04L 5/008; H04L 49/606;
H04L 7/0033; H04L 2012/40293; H04L
2012/5663; H04L 65/1079; H04L 12/287;
H04L 9/3257; H04L 12/54; H04L
2012/4629; H04L 2012/40221; H04L
2025/03382; H04L 67/1019; H04L
12/40195; H04L 41/0627; H04L 49/1576;
H04L 5/0008; H04L 49/503; H04L 5/26;
H04L 2025/03605; H04L 47/6295; H04L
67/2866; H04L 12/40136; H04L
2012/565; H04L 45/06; H04L 7/043;
H04L 41/02; H04L 12/1446; H04L
61/302; H04L 47/60; H04L 2209/043;
H04L 27/066; H04L 45/126; H04L
65/4053; H04L 2101/385; H04L 61/2578;
H04L 65/1013; H04L 2012/40208;
2012/5631; H04L 27/2639; H04L
49/9073; H04L 61/457; H04L 5/0014;
H04L 49/9036; H04L 12/6402; H04L
69/30; H04L 27/2698; H04L 25/0238;
H04L 25/03133; H04L 45/36; H04L
47/726; H04L 47/624; H04L 5/0076;
H04L 25/4927; H04L 12/40163; H04L
67/1072; H04L 49/506; H04L 5/04; H04L
12/4666; H04L 45/583; H04L 12/1496;
H04L 49/208; H04L 61/2539; H04L
2012/5658; H04L 41/26; H04L 9/0875;
H04L 12/2852; H04L 67/1085; H04L
67/1006; H04L 2209/68; H04L 47/785;
H04L 12/40026; H04L 9/0668; H04L
12/2876; H04L 2025/03611; H04L
49/358; H04L 27/2654; H04L 7/007;
H04L 2027/0087; H04L 27/2331; H04L
2101/365; H04L 47/722; H04L 2463/081;
H04L 27/26416; H04L 12/2872; H04L
25/0286; H04L 49/3072; H04L 63/064;
H04L 12/40123; H04L 27/2624; H04L
25/493; H04L 41/0622; H04L 49/9021;
H04L 61/503; H04L 5/12; H04L
2012/5612; H04L 47/767; H04L 49/9084;
H04L 27/0004; H04L 2101/37; H04L
67/1089; H04L 49/9068; H04L 49/355;
H04L 2027/0018; H04L 45/484; H04L
41/0645; H04L 12/2878; H04L 45/502;
H04L 27/08; H04L 49/505; H04L
27/3872; H04L 5/0003; H04L 27/28;
H04L 1/0082; H04L 61/4555; H04L
25/03203; H04L 2012/5614; H04L
65/1108; H04L 45/304; H04L 25/0391;
H04L 5/1453; H04L 25/0274; H04L
12/1482; H04L 227/30; H04L 27/3444;
H04L 12/40084; H04L 2007/045; H04L
2025/03401; H04L 2101/695; H04L
2101/681; H04L 43/0841; H04L 49/153;
H04L 25/03242; H04L 5/1484; H04L
2012/6478; H04L 47/622; H04L
25/03286; H04L 27/2651; H04L 27/233;
H04L 27/3818; H04L 47/21; H04L
9/3026; H04L 47/74; H04L 2101/375;
H04L 27/148; H04L 2012/445; H04L
47/525; H04L 7/0058; H04L 47/62; H04L
1/165; H04L 45/025; H04L 12/2881;
H04L 2101/33; H04L 9/3006; H04L
12/422; H04L 51/21; H04L 27/264;
H04L 2027/0069; H04L 25/4975; H04L 45/128;
H04L 47/6245; H04L 49/9031; H04L
49/251; H04L 5/0019; H04L 25/03197;
H04L 45/645; H04L 47/562; H04L
7/0066; H04L 2101/672; H04L 27/2278;
H04L 12/52; H04L 49/105; H04L 49/206;
H04L 12/465; H04L 1/244; H04L 12/50;
H04L 61/2585; H04L 2025/0377; H04L
12/40097; H04L 2012/5634; H04L
12/145; H04L 13/08; H04L 2012/6443;
H04L 45/563; H04L 47/40; H04L
25/4923; H04L 2012/5675; H04L
2012/5685; H04L 27/2275; H04L 1/0022;
H04L 47/625; H04L 25/24; H04L
27/2338; H04L 27/1563; H04L
2012/6489; H04L 27/16; H04L 27/3455;
H04L 47/627; H04L 5/20; H04L 49/405;
H04L 12/141; H04L 2012/6421; H04L
2209/50; H04L 5/0017; H04L 49/60;
H04L 12/5691; H04L 61/2525; H04L
2209/64; H04L 25/0234; H04L 47/728;
H04L 47/521; H04L 2012/5645; H04L
65/10; H04L 49/508; H04L 12/1414;
H04L 41/048; H04L 27/122; H04L
61/2582; H04L 1/002; H04L 1/0612;
H04L 25/40; H04L 25/4919; H04L 67/50;
H04L 49/107; H04L 27/2035; H04L
2025/03636; H04L 27/2272; H04L
25/03044; H04L 41/5083; H04L 12/1421;

H04L 67/1396; H04L 27/2096; H04L 2012/5653; H04L 2012/421; H04L 41/0636; H04L 49/3054; H04L 12/1417; H04L 2025/03503; H04L 49/1507; H04L 25/03184; H04L 2012/5629; H04L 45/7452; H04L 49/501; H04L 1/14; H04L 2012/40267; H04L 25/03929; H04L 27/345; H04L 47/629; H04L 27/3827; H04L 12/1804; H04L 27/1525; H04L 27/2003; H04L 2027/0032; H04L 47/6235; H04L 27/2653; H04L 45/488; H04L 2012/5621; H04L 27/186; H04L 2025/03363; H04L 63/304; H04L 9/007; H04L 25/4925; H04L 47/58; H04L 2012/5624; H04L 12/2863; H04L 25/0305; H04L 27/103; H04L 49/3036; H04L 25/03993; H04L 5/0089; H04L 25/45; H04L 12/2858; H04L 2012/6427; H04L 41/5093; H04L 25/03114; H04L 5/0075; H04L 25/0294; H04L 41/5016; H04L 25/068; H04L 2012/5637; H04L 12/1492; H04L 2027/0038; H04L 47/786; H04L 69/328; H04L 2463/142; H04L 25/026; H04L 25/242; H04L 27/2053; H04L 61/3005; H04L 2027/0093; H04L 25/12; H04L 1/0081; H04L 45/40; H04L 27/2684; H04L 41/0613; H04L 12/40156; H04L 47/196; H04L 41/0618; H04L 12/1464; H04L 49/1546; H04L 5/0071; H04L 27/001; H04L 12/1489; H04L 25/03165; H04L 2025/03369; H04L 25/03904; H04L 2012/5664; H04L 25/03299; H04L 2101/618; H04L 2025/03509; H04L 25/0307; H04L 7/0045; H04L 41/507; H04L 67/1082; H04L 67/1053; H04L 25/0214; H04L 27/263; H04L 2025/03726; H04L 49/112; H04L 61/2546; H04L 1/0088; H04L 12/2865; H04L 27/2617; H04L 47/326; H04L 49/9023; H04L 27/144; H04L 2025/03624; H04L 47/741; H04L 25/4915; H04L 27/2334; H04L 2007/047; H04L 25/03942; H04L 2012/5654; H04L 61/2532; H04L 12/06; H04L 5/1415; H04L 12/4662; H04L 2025/03796; H04L 2012/5648; H04L 25/03955; H04L 2025/03356; H04L 41/0293; H04L 2012/5684; H04L 25/0288; H04L 45/655; H04L 2027/0034; H04L 45/0377; H04L 49/608; H04L 2209/606; H04L 49/9015; H04L 12/146; H04L 25/069; H04L 2025/03681; H04L 27/223; H04L 47/568; H04L 2012/5646; H04L 2012/5678; H04L 2012/6464; H04L 1/0044; H04L 27/2082; H04L 49/9052; H04L 1/248; H04L 12/184; H04L 47/6265; H04L 2025/03783; H04L 47/23; H04L 1/245; H04L 27/2276; H04L 27/26362; H04L 2012/5608; H04L 2012/5683; H04L 27/2631; H04L 47/54; H04L 27/2067; H04L 27/26412; H04L 12/2867; H04L 49/1584; H04L 25/0268; H04L 27/2633; H04L 49/455; H04L 49/9089; H04L 67/107; H04L 12/2889; H04L 12/4616; H04L 27/3433; H04L 27/3461; H04L 9/34; H04L 12/40202; H04L 47/6205; H04L 2027/0048; H04L 2101/395; H04L 47/6285; H04L 27/2032; H04L 2101/627; H04L 45/023; H04L 12/4658; H04L 25/0218; H04L 27/26414; H04L 12/427; H04L 2025/03687; H04L 27/2644; H04L 9/36; H04L 9/005; H04L 61/4505; H04L 2012/6456; H04L 2012/5639; H04L 67/1057; H04L 49/604; H04L 67/1055; H04L 5/18; H04L 25/03968; H04L 27/106; H04L 2027/0073; H04L 25/0258; H04L 47/628; H04L 27/2014; H04L 2012/5617; H04L 25/03216; H04L 47/37; H04L 2101/645; H04L 1/241; H04L 2012/6483; H04L 27/3427; H04L 12/2883; H04L 25/03923; H04L 27/2643; H04L 27/389; H04L 1/0687; H04L 2027/0081; H04L 45/85; H04L 2012/5606; H04L 9/10; H04L 12/4654; H04L 47/431; H04L 25/03337; H04L 2012/5673; H04L 2025/03496; H04L 27/2092; H04L 27/3494; H04L 27/365; H04L 5/24; H04L 12/1475; H04L 25/03273; H04L 41/028; H04L 7/0278; H04L 2101/38; H04L 25/029; H04L 2012/5613; H04L 2012/6462; H04L 2025/03535; H04L 47/267; H04L 2025/03445; H04L 7/0276; H04L 5/1492; H04L 25/03987; H04L 1/0681; H04L 2025/03407; H04L 47/787; H04L 27/2652; H04L 51/07; H04L 27/2686; H04L 7/0332; H04L 25/10; H04L 2027/0022; H04L 49/1561; H04L 27/3836; H04L 17/00; H04L 2012/6448; H04L 27/3472; H04L 2025/03471

USPC .......................................................... 455/450

See application file for complete search history.

(56) References Cited

U.S. PATENT DOCUMENTS

| | | |
|---|---|---|
| 2016/0081091 A1 | 3/2016 | Kim et al. |
| 2018/0279310 A1* | 9/2018 | Chen ..................... H04L 5/001 |
| 2018/0359756 A1 | 12/2018 | Webb et al. |
| 2020/0107227 A1 | 4/2020 | Xu et al. |
| 2020/0154446 A1* | 5/2020 | Yerramalli ............ H04W 72/23 |
| 2020/0344019 A1* | 10/2020 | Da Silva .................. H04L 1/203 |
| 2020/0403743 A1* | 12/2020 | Bergqvist .............. H04L 5/0032 |
| 2021/0029622 A1* | 1/2021 | Höhne ................... H04W 76/14 |
| 2021/0175985 A1* | 6/2021 | Yoon ....................... H04W 56/00 |
| 2021/0176656 A1* | 6/2021 | Sang .................... H04W 36/302 |
| 2021/0235492 A1* | 7/2021 | Iyer ........................ H04W 72/23 |
| 2021/0399854 A1 | 12/2021 | Outes Carnero et al. |
| 2022/0264589 A1 | 8/2022 | Sun et al. |
| 2022/0304026 A1 | 9/2022 | Molavianjazi et al. |
| 2022/0330133 A1* | 10/2022 | Chen ..................... H04W 48/02 |
| 2022/0377580 A1* | 11/2022 | Karlsson ............... H04W 48/16 |
| 2023/0007656 A1* | 1/2023 | Guo ........................ H04L 5/0094 |
| 2023/0027953 A1* | 1/2023 | Palle Venkata ........ H04W 48/08 |
| 2023/0140232 A1* | 5/2023 | Zhang ................... H04W 56/00 370/503 |
| 2023/0189348 A1* | 6/2023 | Kim .................... H04W 74/0866 370/329 |
| 2023/0224878 A1* | 7/2023 | Lei ......................... H04L 5/0053 370/329 |
| 2023/0276362 A1* | 8/2023 | Reial ..................... H04W 56/0015 370/311 |
| 2023/0276388 A1* | 8/2023 | Hu ........................ H04L 27/2666 |
| 2023/0292322 A1* | 9/2023 | Kim ...................... H04L 5/0012 |

(56) References Cited

U.S. PATENT DOCUMENTS

| | | | |
|---|---|---|---|
| 2023/0318687 A1* | 10/2023 | Kim | H04B 7/06968 370/329 |
| 2023/0354158 A1* | 11/2023 | Huang | H04L 1/0071 |
| 2023/0354225 A1* | 11/2023 | Kwak | H04W 24/08 |
| 2023/0354348 A1* | 11/2023 | Kim | H04W 72/0457 |
| 2023/0379769 A1* | 11/2023 | Ramachandra | H04W 74/0833 |
| 2024/0008067 A1* | 1/2024 | Park | H04L 41/16 |
| 2024/0049197 A1* | 2/2024 | MolavianJazi | H04W 72/046 |
| 2024/0056846 A1* | 2/2024 | Sun | H04W 24/08 |
| 2024/0098536 A1* | 3/2024 | Sharma | H04W 56/001 |
| 2024/0121727 A1* | 4/2024 | Zhou | H04W 52/365 |
| 2024/0214879 A1* | 6/2024 | Chandrashekar | H04W 36/0058 |
| 2024/0236793 A1* | 7/2024 | Chandrashekar | H04W 36/06 |
| 2024/0243895 A1* | 7/2024 | Rastegardoost | H04W 72/51 |
| 2024/0244552 A1 | 7/2024 | Nagano et al. | |
| 2024/0340795 A1* | 10/2024 | Kim | H04L 1/1887 |
| 2024/0340852 A1* | 10/2024 | Jeong | H04W 68/02 |
| 2024/0373303 A1* | 11/2024 | He | H04W 36/302 |
| 2024/0397394 A1* | 11/2024 | Ramachandra | H04W 36/0088 |
| 2024/0397409 A1* | 11/2024 | Lei | H04L 5/0094 |
| 2024/0421955 A1* | 12/2024 | Peng | H04L 5/0051 |
| 2025/0024436 A1* | 1/2025 | Zhang | H04L 5/0094 |
| 2025/0031188 A1* | 1/2025 | Kim | H04L 5/0016 |
| 2025/0039715 A1* | 1/2025 | Tang | H04L 5/0007 |
| 2025/0048341 A1* | 2/2025 | Takahashi | H04W 72/232 |
| 2025/0055666 A1* | 2/2025 | Takeda | H04L 5/1469 |
| 2025/0056296 A1* | 2/2025 | Al | H04W 24/10 |
| 2025/0056442 A1* | 2/2025 | Takeda | H04W 16/28 |
| 2025/0056548 A1* | 2/2025 | Lei | H04L 5/0048 |
| 2025/0056565 A1* | 2/2025 | Guo | H04L 5/0048 |
| 2025/0071597 A1* | 2/2025 | Lei | H04W 72/51 |
| 2025/0081185 A1* | 3/2025 | Maaref | H04W 72/1263 |
| 2025/0081187 A1* | 3/2025 | Takeda | H04L 5/0098 |
| 2025/0097862 A1* | 3/2025 | Takahashi | H04W 72/20 |
| 2025/0097983 A1* | 3/2025 | Lei | H04W 74/0833 |
| 2025/0113403 A1* | 4/2025 | Kim | H04L 5/0048 |
| 2025/0119956 A1* | 4/2025 | Guo | H04W 74/006 |
| 2025/0126583 A1* | 4/2025 | Lei | H04W 8/08 |
| 2025/0133575 A1* | 4/2025 | Maaref | H04W 72/232 |
| 2025/0159706 A1* | 5/2025 | Kazmi | H04L 5/001 |
| 2025/0184887 A1* | 6/2025 | Zhou | H04W 52/0206 |

FOREIGN PATENT DOCUMENTS

| | | |
|---|---|---|
| EP | 3 713 333 A1 | 9/2020 |
| WO | 2021071397 A1 | 4/2021 |
| WO | 2021170311 A1 | 9/2021 |
| WO | 2023/054686 A1 | 4/2023 |
| WO | 2023137091 A1 | 7/2023 |

OTHER PUBLICATIONS

"3rd Generation Partnership Project; Technical Specification Group Radio Access Network; NR; Physical layer procedures for control (Release 18)", 3GPP TS 38.213, V18.0.0, Sep. 2023, pp. 1-285.

"3rd Generation Partnership Project; Technical Specification Group Radio Access Network; NR; Requirements for support of radio resource management (Release 18)", 3GPP TS 38.133, V18.3.0, Sep. 2023, 6091 pages.

"3rd Generation Partnership Project; Technical Specification Group Radio Access Network; NR; Physical channels and modulation (Release 18)", 3GPP TS 38.211, V18.0.0, Sep. 2023, pp. 1-159.

"Discussion on selective activation of SCGs for NR-DC", 3GPP TSG-RAN WG2 Meeting #121, R2-2300384, Agenda: 8.4.3, Oppo, Feb. 2023, pp. 1-5.

Office action received for corresponding Finnish Patent Application No. 20245340, dated Oct. 10, 2024, 10 pages.

Office action received for corresponding Finnish Patent Application No. 20245340, dated Mar. 3, 2025, 7 pages.

Extended European search report corresponding to EP Application No. 25165528.8, dated Aug. 25, 2025.

* cited by examiner

NESTED CELL STRUCTURE

RELATED APPLICATION

This application claims benefit of priority from Finnish Patent App. No 20245340, filed Mar. 26, 2024, the disclosure of which is hereby incorporated in its entirety by reference herein.

FIELD

The exemplary and non-limiting embodiments of the invention relate generally to wireless communication systems. Embodiments of the invention relate especially to apparatuses and methods in wireless communication networks.

BACKGROUND

Wireless telecommunication systems are under constant development. There is a constant need for higher data rates and high quality of service. It is important to utilise the bandwidth available for communication as efficiently as possible. Sectored cells have been taken into use, but other enhancements are also required.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to a more detailed description that is presented later.

According to an aspect of the present invention, there is provided an apparatus in a communication system, comprising: a processor; and a memory including instructions, the instructions, when executed by the processor, cause the apparatus to: transmitting a cell defining Synchronization Signal Block on a first frequency location inside a given frequency bandwidth; and transmitting a second Synchronization Signal Block on a second frequency location inside a second bandwidth inside the given frequency bandwidth; providing a main cell on the given frequency bandwidth by utilising the cell defining Synchronization Signal Block; providing at least one second cell on the second bandwidth within the given frequency bandwidth by utilising the second Synchronization Signal Block and the main and the at least one second cell serving the same geographical area.

According to an aspect of the present invention, there is provided a method in an apparatus in a communication system comprising the steps of: transmitting a cell defining Synchronization Signal Block on a first frequency location inside a given frequency bandwidth; and transmitting a second Synchronization Signal Block on a second frequency location inside a second bandwidth inside the given frequency bandwidth; providing a main cell on the given frequency bandwidth by utilising the cell defining Synchronization Signal Block; providing at least one second cell on the second bandwidth within the given frequency bandwidth by utilising the second Synchronization Signal Block; the main and the at least one second cell serving the same geographical area.

According to an aspect of the present invention, there is provided a computer program comprising instructions, which, when executed by an apparatus, cause the apparatus to perform at least the following: transmit a cell defining Synchronization Signal Block on a first frequency location inside a given frequency bandwidth; and transmit a second Synchronization Signal Block on a second frequency location inside a second bandwidth inside the given frequency bandwidth; provide a main cell on the given frequency bandwidth by utilising the cell defining Synchronization Signal Block; provide at least one second cell on the second bandwidth within the given frequency bandwidth by utilising the second Synchronization Signal Block; the main and the at least one second cell serving the same geographical area.

In an embodiment, there is provided an apparatus comprising means for transmitting a cell defining Synchronization Signal Block on a first frequency location inside a given frequency bandwidth; means for transmitting a second Synchronization Signal Block on a second frequency location inside a second bandwidth inside the given frequency bandwidth; means for providing a main cell on the given frequency bandwidth by utilising the cell defining Synchronization Signal Block; means for providing at least one second cell on the second bandwidth within the given frequency bandwidth by utilising the second Synchronization Signal Block; the main and the at least one second cell serving the same geographical area.

One or more examples of implementations are set forth in more detail in the accompanying drawings and the description below. Other features will be apparent from the description and drawings, and from the claims. The embodiments and/or examples and features, if any, described in this specification that do not fall under the scope of the independent claims are to be interpreted as examples useful for understanding various embodiments of the invention.

LIST OF DRAWINGS

Embodiments of the present invention are described below, by way of example only, with reference to the accompanying drawings, in which FIGS. 1 and 2 illustrate examples of simplified system architecture of a communication system;

DESCRIPTION OF SOME EMBODIMENTS

Figure 1:
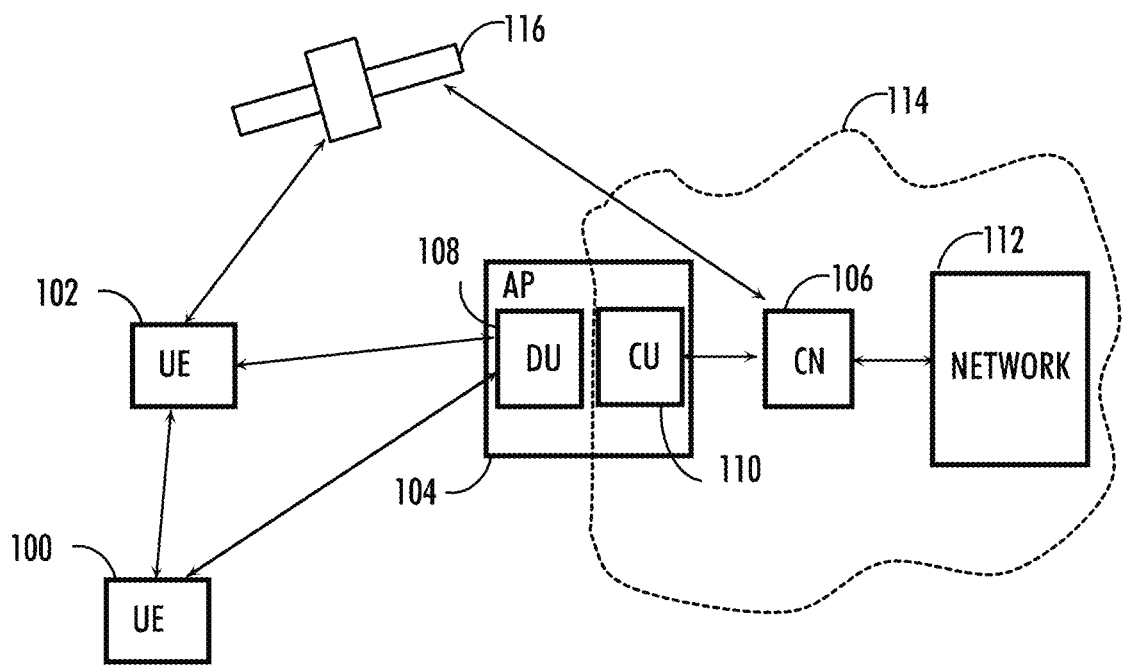

FIG. 1 shows devices 100 and 102. The devices 100 and 102 may, for example, be user devices or user terminals. The devices 100 and 102 are configured to be in a wireless connection on one or more communication channels with a node 104. The node 104 is further connected to a core network 106. In one example, the node 104 may be an access node, such as (e/g) NodeB or (e/g) NB, serving devices in a cell. In one example, the node 104 may be a non-3GPP access node. The physical link from a device to a (e/g) NodeB is called uplink or reverse link and the physical link from the (e/g) NodeB to the device is called downlink or forward link. It should be appreciated that (e/g) NodeBs or their functionalities may be implemented by using any node, host, server or access point etc. entity suitable for such a usage.

A communications system typically comprises more than one (e/g) NodeB in which case the (e/g) NodeBs may also be configured to communicate with one another over links, wired or wireless, designed for the purpose. These links may be used for signalling and/or data transmission purposes. The (e/g) NodeB is a computing device configured to control the radio resources of communication system it is coupled to. The NodeB may also be referred to as a base station, an access point or any other type of interfacing device including a relay station capable of operating in a wireless environment. The (e/g) NodeB includes or is coupled to transceivers. From the transceivers of the (e/g) NodeB, a connection is provided to an antenna unit that establishes bi-directional radio links to devices. The antenna unit may comprise a plurality of antennas or antenna elements. The (e/g) NodeB is further connected to the core network 106 (CN or next generation core NGC).

The device (also called a subscriber unit, user device, user equipment (UE), user terminal, terminal device, etc.) illustrates one type of an apparatus to which resources on the air interface are allocated and assigned, and thus any feature described herein with a device may be implemented with a corresponding apparatus, such as a relay node. An example of such a relay node is a layer 3 relay (self-backhauling relay) towards the base station.

The device typically refers to a device (e.g. a portable or non-portable computing device) that includes wireless mobile communication devices operating with or without an universal subscriber identification module (USIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a device may also be a nearly exclusive uplink only device, of which an example is a camera or video camera loading images or video clips to a network. A device may also be a device having capability to operate in Internet of Things (IoT) network which is a scenario in which objects are provided with the ability to transfer data over a network without requiring human-to-human or human-to-computer interaction, e.g. to be used in smart power grids and connected vehicles. The device may also utilise cloud. In some applications, a device may comprise a user portable device with radio parts (such as a watch, earphones or eyeglasses) and the computation is carried out in the cloud. The device (or in some embodiments a layer 3 relay node) is configured to perform one or more of user equipment functionalities.

Various techniques described herein may also be applied to a cyber-physical system (CPS) (a system of collaborating computational elements controlling physical entities). CPS may enable the implementation and exploitation of massive amounts of interconnected information and communications technology, ICT, devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G or NR (New Radio) enables using multiple input-multiple output (MIMO) antennas, many more base stations or nodes than the Long Term Evolution, LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, e.g. below 6 GHz or above 24 GHz, cmWave and mmWave, and also being integrable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, 6 or above 24 GHz-cmWave and mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks 112, such as a public switched telephone network, or a VoIP network, or the Internet, or a private network, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

The technology of Edge cloud may be brought into a radio access network (RAN) by utilizing network function virtualization (NFV) and software defined networking (SDN). Using the technology of edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at or close to a remote antenna site (in a distributed unit, DU 108) and non-real time functions being carried out in a centralized manner (in a centralized unit, CU 110).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication 116 to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano) satellites are deployed). Each satellite in the mega-constellation may cover several satellite-enabled network entities that create on-ground cells. The on-ground cells may be created through an on-ground relay node or by a gNB located on-ground or in a satellite.

It is obvious for a person skilled in the art that the depicted system is only an example of a part of a radio access system and in practice, the system may comprise a plurality of (e/g) NodeBs, the device may have an access to a plurality of radio cells and the system may comprise also other apparatuses, such as physical layer relay nodes or other network elements, etc. At least one of the (e/g) NodeBs or may be a Home (e/g) NodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g) NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g) NodeBs are required to provide such a network structure.

For fulfilling the need for improving the deployment and performance of communication systems, the concept of "plug-and-play" (e/g) NodeBs has been introduced. Typically, a network which is able to use "plug-and-play" (e/g) Node Bs, includes, in addition to Home (e/g) NodeBs (H (e/g) NodeBs), a home node B gateway, or HNB-GW (not shown in FIG. 1). A HNB Gateway (HNB-GW), which is typically installed within an operator's network may aggregate traffic from a large number of HNBs back to a core network.

Figure 2:
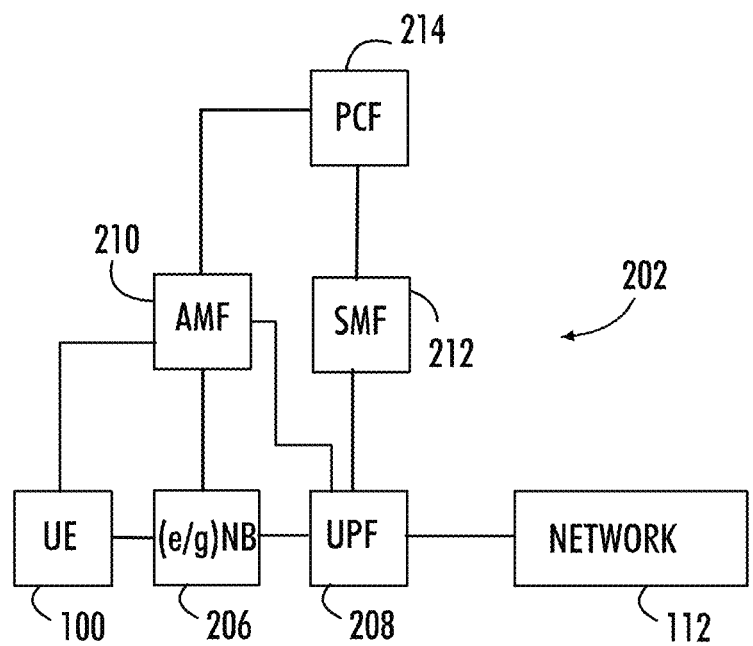

FIG. 2 illustrates an example of a communication system based on 5G network components. A terminal device or user equipment 100 communicating via a 5G network 202 with a data network 112. The user terminal 100 is connected to a Radio Access Network RAN node, such as (e/g) NodeB 206 which provides the user terminal a connection to the network 112 via one or more User Plane Functions 208. The user terminal 100 is further connected to Core Access and Mobility Management Function, AMF 210, which is a control plane core connector for (radio) access network and can be seen from this perspective as the 5G version of Mobility Management Entity, MME, in LTE. The 5G network further comprises Session Management Function, SMF 212, which is responsible for subscriber sessions, such as session establishment, modify and release, and a Policy Control Function 214 which is configured to govern network behavior by providing policy rules to control plane functions.

When a 5G cell is established, a given frequency bandwidth is allocated to the 5G cell. The allocated bandwidth may be denoted as cell bandwidth.

The cell bandwidth of a 5G cell can comprise several parts. Each part or component serves specific purposes in the operation of the cell, enabling communication within the cell and with connected devices.

The cell bandwidth can comprise bandwidth parts, BWP. They may be uplink or downlink or both. Downlink bandwidth is allocated for transmitting data from the gNodeB to terminal devices or user equipment, UE, or devices within the cell. It is used for delivering content, internet access, and other services from the network to the user devices. Uplink bandwidth is utilised for transmitting data from the terminal devices or UEs to the gNodeB.

Within the cell bandwidth, given frequencies are designated for control channels. Some part designated for control channel occupy the given frequencies all the time or in specific time slots. The control channels are used for managing communication between the gNodeB and the devices in the cell. They include channels for synchronization, channel assignment, handover signalling, and other control functions.

When a gNodeB configures the 5G cell it is serving, it allocates the cell bandwidth divided into elementary parts which may be defined as Common Resource Blocks, CRB. The lowest frequency of the cell bandwidth, which is defined as SCS-SpecificCarrier (SCS denoting Subcarrier Spacing) corresponds to a so-called reference pointA which is defined as center of the CRB0. Other cell components are defined in reference to this pointA.

Among the components defined in reference to pointA are Synchronization Signal Block, SSB, and bandwidth parts, BWPs. A BWP may be described as a set of contiguous Resource Blocks, RBs, configured inside the cell bandwidth. The bandwidth of a BWP may smaller than or equal to the cell bandwidth.

For simplicity, in the following examples it is assumed that the SCS Specific carrier is defined in whole cell bandwidth.

The cell bandwidth can be fully or partly used by bandwidth parts. The bandwidth parts provide an organized structure of the resources required for the connections of the terminal devices or UEs.

A bandwidth part can be independently configured. It may comprise shared (common) or dedicated resources needed to serve terminal devices at connection time, resources available in the control and shared channels such as Physical random-access channel PRACH, Physical downlink control channel PDCCH, Physical downlink shared channel PDSCH, Physical uplink control channel PUCCH, and Physical uplink shared channel PUSCH.

Sizes and positions of the bandwidth parts are flexible and configurable. Each bandwidth part of a cell may differ in size and position. The bandwidth parts can also overlap each other within the cell bandwidth.

A cell can contain several bandwidth parts which may be used for specific purposes. Number of bandwidth parts available in a cell is not limited by 3GPP. In the minimum configuration the cell shall contain at least one bandwidth part defined as initial BWP for each downlink and uplink directions. Each of BWPs may differ in size and position. BWPs may entirely or partly overlap.

Figure 3A:
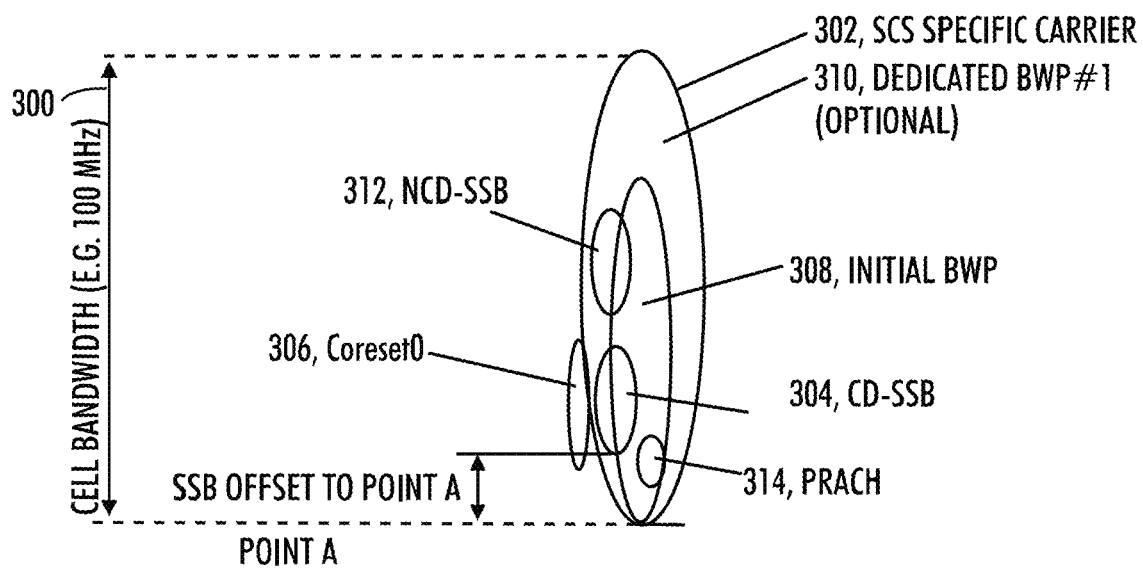
FIGS. 3A and 3B illustrates an example of usage of cell bandwidth.

FIG. 3A illustrates an example of usage of cell bandwidth of a 5G cell. The cell has the cell bandwidth 300 of 100 MHz (for example). The figure illustrates the SCS-SpecificCarrier 302. The 5G cell comprises cell defined SSB CD-SSB 304, CORESET0 306 and set of Bandwidth Parts in both Uplink and Downlink direction. The initial BWP 308 (Downlink and Uplink) is mandatory to be defined in the cell. Dedicated BWPs are optional. There may be more than one Dedicated BWP defined in the cell—each may differ in size and position. In the example of FIG. 3A, there is one dedicated BWP 310 and a non cell-defining SSB 312. The cell further comprises random access channel PRACH 314.

A typical cell configured with multiple BWPs has one BWP having the size of the cell bandwidth and in addition overlapped BWPs with smaller bandwidths, all sharing the common cell resources like SSB, PRACH, PUCCH. In such a case, terminal devices typically use the cell bandwidth BWP. Small BWP shares also overlapped bandwidth. If the initial BWP is configured with dedicated configuration (initialDownlinkBWP BWP-DownlinkDedicated and initialUplinkBWP BWP-UplinkDedicated)—it can be used in the same way as dedicated BWP.

The bandwidth of the Initial BWP determines the bandwidth which a terminal device is required to support before getting an access to the cell.

A terminal device connected to the cell can be configured with up to four BWPs at the same time but to transmit data it can use only one BWP at a time, which is denoted as Active BWP. A terminal device can be dynamically switched with a Downlink Control Information, DCI, switch between bandwidth parts defined in the cell and configured at the terminal device.

A terminal device may camp on a cell with initial access scenario or with handover. A terminal device may at the same time be connected to multiple cells, for example, in a Carrier Aggregation scenario.

Let us first study how a terminal device selects and attaches itself to a 5G cell.

To use a cell, a terminal device needs to collect the data about the cell configuration and resources dedicated to the terminal device. The communication providing required data to the terminal device is carried over Radio Resource Control, RRC, protocol. A gNB provides this information at different stages of the communication providing information necessary at each stage.

When a terminal device camps on the cell following initial access from RRC_IDLE scenario, a given Initial Access Procedure is followed. At the beginning, the terminal device in idle state needs to find and to select the cell. At that stage a gNB is in passive mode advertising the information about the structure and parameters of the cell necessary to start connection with the cell. The gNB periodically broadcasts Minimum System Information (MSI).

The Minimum System Information (MSI) corresponds to Primary Synchronization Signal, PSS, and Secondary Synchronization Signal, SSS, providing Physical Cell ID, PCI, and Master Information Block, MIB. SSS, PSS and Physical broadcast channel, PBCH, are components of Synchronization Signal Block, SSB.

A terminal device in search of a cell to camp on, is configured to scan predefined frequencies defined by 3GPP as Global Synchronization Channel Number, GSCN, with frequency step recognized as GSCN raster. At each GSCN, the terminal device tries to detect the predefined signals: SSS and PSS. In a case when the terminal device discovers the SSS and PSS on certain GSCN frequency, the terminal device tries to find PBCH to read MIB message. Using MIB, the terminal device collects basic data about the cell, such as information about sub-carrier spacing, cell barring and position of the CORESET0.

When the terminal device has obtained information on CORESET0, it can use it to read System Information Block 1, SIB1, message. With SIB1, the terminal device collects information which allows it to proceed with further steps of the initial access procedure (starting from Random Access):
  pointA position (offsetToPointA)
  SCS-SpecificCarrier definition (offsetToCarrier, carrierBandwidth)
  Initial BWP common configuration.

The Initial BWP common configuration comprises position and size of the Initial BWP, Physical downlink control channel, PDCCH, common configuration (CORESETs, Search Spaces), Physical downlink shared channel, PDSCH, common configuration, RACH common configuration and Physical uplink shared channel, PUSCH, common configuration.

At this stage, the terminal device has all necessary information required to initiate a connection with the cell.

When the terminal device is staring a connection with a cell, it checks the size of the initial BWP and whether it can support minimum available bandwidth of the cell. If the terminal device is not able to support at least a bandwidth of the Initial BWP, it will not be able to camp on the cell. In such a case, the terminal device needs to reselect another cell. This means a re-start of scanning of GSCN frequencies to find a suitable cell.

If the terminal device is capable of supporting the bandwidth of Initial BWP of the cell, it uses the common resources of Initial BWP (e.g. PRACH) to establish a RRC connection with the cell. Dedicated configuration for the terminal device is provided during random access procedure (RRC Setup message) and afterwards (RRCReconfiguration messages).

When the terminal device initiates the connection by sending an RRC Setup Request, the gNB as a response configures the terminal device UE with a dedicated configuration. The gNB may configure the terminal device to use the Initial BWP for transmission or it may switch the terminal device to a dedicated BWP and configure additional dedicated BWPs for the terminal device if needed. Switching the terminal device to a dedicated BWP may also be done later.

Each BWP of the cell can provide autonomous structure of the resources available in the BWP. The BWPs may share same resources between each other, or they can define its own unique set of resources. For example, initial BWP and dedicated BWP may use the CORESET0 for common PDCCH transmission and both can have dedicated CORESETs for UE specific PDCCH.

When many terminal devices camp on a cell, there may be a non-balanced load on the cell bandwidth. This may occur for example when the cell configuration comprises multiple bandwidth parts of different sizes.

In a situation when the more than one bandwidth parts require shared common resources (SSB/PBCH, PRACH, PUCCH area). This may lead to configuration which groups bandwidth parts in one area, concentrated around the shared common resources.

Figure 3B:
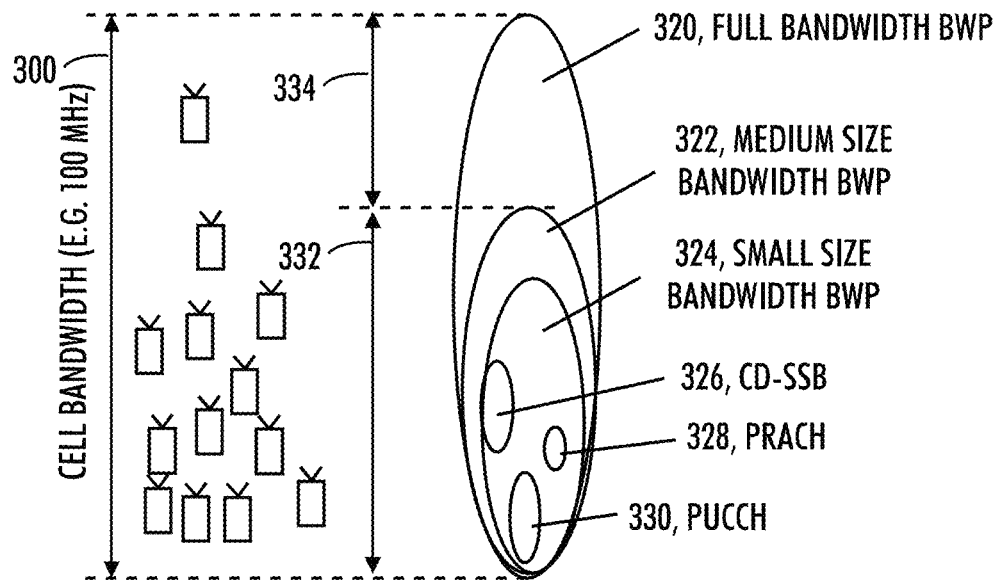

This is illustrated in FIG. 3B. The figure illustrates a cell with three BWPs, one BWP 320 having bandwidth of the cell bandwidth, one medium size BWP 322 and one small size BWP 324. The resources, cell-defining SSB 326, PRACH 328 and PUCCH 330 are located at the beginning of the cell bandwidth in the bandwidth share by all BWPs.

Typically, used configurations of the cell with multiple BWPs define the cell in such a way that all BWPs overlap and start at the same edge of the cell. BWP restriction requires to have PRACH and SSB inside the BWP—that leads to the configuration which positions SSB and PRACH in the smallest BWP 324. In case of high usage of the cell with high number of the terminal devices, the area of the smallest BWP 324 is heavily used by the terminal devices configured with smallest BWP 324 and other BWPs 320, 322. In result the smallest BWP area (in terms of number of available Physical resource Blocks, PRBs) is used by components common for all BWPs (SSB, PRACH, PUCCH), grants/assignments for terminal devices from bigger BWPs 320, 322 and grants/assignments for terminal devices of the smallest BWP 324.

In case of big disproportion of the smallest and biggest BWP, the cell configuration has to be optimized to serve terminal devices in biggest BWP effectively. This means allocation of larger number of resources (e.g. PUCCH resources) to secure that. If PUCCH is common for all BWPs and shared with the smallest BWP it needs to be in area of the smallest BWP decreasing number of PUSCH in smallest BWP.

As a numerical example, if a 100 MHz TDD cell (having 273 PRBs) will be planned to have high number of terminal devices connected at the same time (e.g. 500 terminal devices), it will need to have approximately 36 PRBs for PUCCH. If the smallest BWP in the cell will be 20 MHZ (51 PRB) and the smallest BWP will share PUCCH with large 100 MHz BWP—only 15 PRBs will be available for PUSCH in the smallest BWP.

In the example of FIG. 3B, there is an overloaded bandwidth area 332 in the bandwidth shared by all BWPs and non-overloaded area 334 served by the biggest BWP alone.

In 5G a so-called reduced capacity or RedCap terminal devices have been introduced. A RedCap device is designed to provide a cost-effective device for applications that do not require the full capabilities of 5G. Examples of possible RedCap devices are wearable devices such as smart watches and sensor sand Internet-Of-Things devices. RedCap devices may support a relatively narrow bandwidth up to 20 MHz in Frequency Range1 and relatively low throughput compared to normal mobile phones. Thus, in many cases they cannot utilise Initial BWPs designed to normal devices.

One problem associated with prior art cell is how to support terminal devices supporting limited bandwidth in cells with large bandwidth. The size of the Initial BWP of a cell is determining minimal bandwidth that a terminal device needs to support so that the terminal device may camp on the cell. In cells with large bandwidth (eg. 100 MHz) the configuration of the cell and Initial BWP is optimized to handle terminal devices supporting large bandwidth. That limits the usage of the cell for the UE requiring low bandwidth, such as RedCap devices.

An embodiment provides a solution on how to organize and configure a 5G cell as a multivariant set of cells. The gNB may be configured to create more than one cell, each having the same coverage area. One of the cells created by the gNB is a main cell and the other cells may be denoted as nested cells, the cell structure may be denoted as a nested cell structure. The main cell and the nested cells may be available in the network simultaneously and independently. The cells can be accessible and can be provided to the terminal devices in multi-variant way. From the terminal device point of view both the main cell and the nested cells are separate independent cells.

The nested cell structure changes the concept of the static cell configuration to dynamic configuration of the cell, changing the cell configuration and adapting to terminal device or network needs.

A terminal device in nested cell structure will be able to recognize a set of separate independent cells which, in reality, will be different variants of one cell's component set. At the same time, the gNB will handle and schedule the terminal device as in single cell using the single scheduler (MAC) process irrespective of which cell the terminal device used to setup the connection.

A nested cell structure consists of set of cells that share the same frequency bandwidth, same coverage area, same radio unit hardware, bandwidth, Bandwidth Part, BWP structure, and scheduler belonging to the Main Cell. Integrity of the system will be kept by the single scheduler process.

In an embodiment, it is proposed how to configure the terminal device in the nested cell structure and how to allocate the terminal device in suitable cell in nested cell structure.

Figure 4:
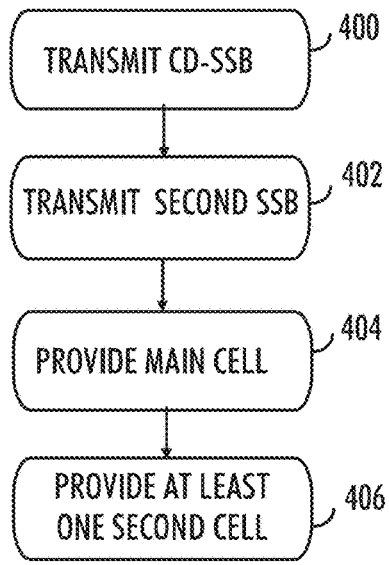
FIG. 4 is a flowchart illustrating an embodiment.

The flowchart of FIG. 4 illustrates an embodiment. The flowchart illustrates an example of an embodiment applied at a network element apparatus. In an embodiment, the apparatus may be a (e/g) NodeB or an access point, or a part of a (e/g) NodeB or an access point, for example. In the embodiment, the network element apparatus creates two or more separate cells serving the same geographical area, one cell being the main (or first) cell and at least one other cell being a nested cell.

In step 400, the apparatus is configured to transmit a cell defining Synchronization Signal Block on a first frequency location inside a given frequency bandwidth.

In step 402, the apparatus is configured to transmit a second Synchronization Signal Block on a second frequency location inside a second bandwidth inside the given frequency bandwidth.

In step 404, the apparatus is configured to provide a main cell on the given frequency bandwidth by utilising at least the cell defining Synchronization Signal Block.

In step 404, the apparatus is configured to provide at least one second cell on the second bandwidth within the given frequency bandwidth by utilising the second Synchronization Signal Block, the main and the at least one second cell serving the same geographical area.

In an embodiment, the second Synchronization Signal Block is a cell defining Synchronization Signal Block.

In an embodiment, the second Synchronization Signal Block is a non cell defining Synchronization Signal Block.

In an embodiment, the first and the second frequency location are non-overlapping.

The main cell and the at least one second cell may have the same Physical Cell Identifier and Cell Identity. In the case of the same Cell Identity, the core network considers them to be one cell.

In an embodiment, the second bandwidth within the given frequency bandwidth is narrower than the given frequency bandwidth. Thus, the main cell has the whole cell bandwidth, but the one or more nested cells have smaller bandwidths. The second bandwidth within the given frequency bandwidth may also equal to the given frequency bandwidth. In that case the main and the one or more nested cells have the same bandwidths In an embodiment, in the main cell one or more bandwidth parts are maintained within the given frequency bandwidth to which bandwidth parts terminal devices may be allocated and providing shared common resources for the bandwidth parts within the given frequency bandwidth. Further, in the at least one second cell at least one second bandwidth part is maintained within the second bandwidth and providing shared common resources for the second bandwidth part within the second bandwidth.

In an embodiment, in the main cell at least one bandwidth part is maintained for uplink and downlink communication with terminal devices and in the at least one second cell at least one bandwidth part is maintained for downlink communication with terminal devices.

In an embodiment, in the main cell at least one bandwidth part is maintained for uplink and downlink communication with terminal devices and in the at least one second cell at least one bandwidth part is maintained for uplink and downlink communication with terminal devices.

In an embodiment, terminal devices are scheduled to the main and at least one second cell with the same scheduler process.

In an embodiment, a terminal device is scheduled from the main cell to a second cell in response to increased load in the main cell.

In an embodiment, a terminal device is scheduled from the main cell to a second cell based on the bandwidth required by the terminal device.

In an embodiment, a terminal device may be scheduled from the main cell to a second cell based on specific terminal device capabilities, operator preferences, such as commands or algorithms to distribute terminal devices between cells or subscriptions or network preferences.

Thus, it is proposed to create at least one additional cell built on BWPs defined in the cell. The main cell corresponds to a present 5G cell.

In general, a 5G cell consist of basic cell components, which are required to configure operational standalone cell in the 5G:
 a cell defining SSB (CD-SSB) with PBCH and MIB message transmitted on it.
 CORESET0—providing basic PDCCH channel, common PDCCH: for SIB1, other SIBS, paging, PRACH, Type3 Search Space.
 Initial BWP as mandatory BWP
 optionally: one dedicated BWP
 optionally: dedicated CORESET
 both Initial BWP and dedicated BWP shall have shared bandwidth containing SSB, CORESET0 and PRACH channel In addition, a 5G cell may have additional cell components which extend the functionality of the 5G cells:
 additional SSB, which may be another Cell Defining SSB CD-SSB or a Non-Cell Defining SSB, NCD-SSB.
 optional additional dedicated BWP (using CORESET0 and dedicated CORESET(s), CORESET0 only or dedicated CORESET(s) without CORESET0)
 additional PRACH channel
 optional RedCap-specific initial BWP (DL and UL)

In the present 5G, a cell has only one cell structure available for a terminal device which limits scenarios of possible cell usage. The elements of the cell structure are selectively configured and used by the terminal device within one scenario.

To improve the non-balanced cell load and cell operation for different kinds of terminal devices, it is proposed to organize cell structure in a novel multi-variant way. The cell structure may comprise a main or first cell and one or more nested cells organized in the structure set named nested cell structure.

The cell components organized in legacy way correspond to the main or first cell. Other variants of the component set will be the nested cell. A nested cell structure may be defined a set of cells consisting of a main or first cell and one or more nested cells.

As mentioned, the cells in the nested cell structure share same frequency bandwidth, i.e., the cell bandwidth, the same coverage area, same radio unit hardware, bandwidth, and scheduler (MAC) belonging to the main cell. All cells in the nested cell structure refer to a single point A—but may have different carrier (channel) bandwidth (cell specific or terminal device specific carrier (channel) bandwidth).

The cell specific carrier (channel) bandwidth is identified by scs-SpecificCarrierList: carrierBandwidth information element of RRC protocol. The terminal device specific carrier (channel) bandwidth is identified by downlink (uplink) ChannelBW-PerSCS-List: carrierBandwidth information element of RRC protocol.

In an embodiment, the cells in a nested cell structure are synchronized in time domain using synchronized system frame numbers which is guaranteed by the usage of single scheduler (MAC). This enables efficient scheduling in the cells.

In an embodiment, there may be multiple instances of SSBs in a nested cell structure. The SSBs may be either cell defining or non cell defining SSBs (CD-SSB or NCD-SSB). Each CD-SSB is exclusively used in one cell of the nested cell structure: main cell or a nested cell. A NCD-SSB can be shared by the cells. All SSBs in the nested cell structure are defined in relation to the same pointA.

A cell is available for the terminal devices by a cell selection procedure, by handover or by carrier aggregation and Multi-Radio Dual Connectivity, MR-DC, cell addition procedure.

In case of cell selection scenario, the terminal device detects the CD-SSB and gather the pointA position receiving SIB1 associated to the CD-SSB. The terminal device uses the offsetToPointA information element of DownlinkConfigCommonSIB information element of SIB1 message. In cell selection scenario only the main cell or nested cell with CD-SSB is available for the terminal device. In other words, only cells with a cell defining SSB are directly accessible by terminal devices.

In a handover situation, carrier aggregation and MR-DC case, the position of n-th SSB in the nested cell structure can be provided to the terminal device directly with usage of absoluteFrequencySSB information element and absoluteFrequencyPointA information element of RRC protocol. In handover, carrier aggregation and MR-DC case main cell with CD-SSB, a nested cell with CD-SSB and a nested cell with NCD-SSB is available for the terminal device. In other words, both the cells with a cell defining SSB and with a non cell-defining SSB are accessible for terminal devices.

When there are multiple instances of the NCD-SSB in the nested cell structure, all NCD-SSBs are defined in relation to the CD-SSB of the main cell. A nested cell using an NCD-SSB is available for a terminal device camped on another 5G cell as the NCD-SSB position can be provided to the terminal device during transfer, handover, carrier aggregation or MR-DC procedures with usage of the absoluteFrequencySSB information element and absoluteFrequencyPointA information element (when needed) of RRC protocol. In that scenario NCD-SSB can be used by non-RedCap UE as well. The NCD-SSB usage for RedCap terminal device in main cell will not be affected.

Let us study the structure of the nested cell structure in more detail. The nested cell structure consists of the main or first cell (which corresponds to presently used 5G cell) and one or more nested cells which are an alternative view of entire cell or the part of the cell component set.

Figure 5A:
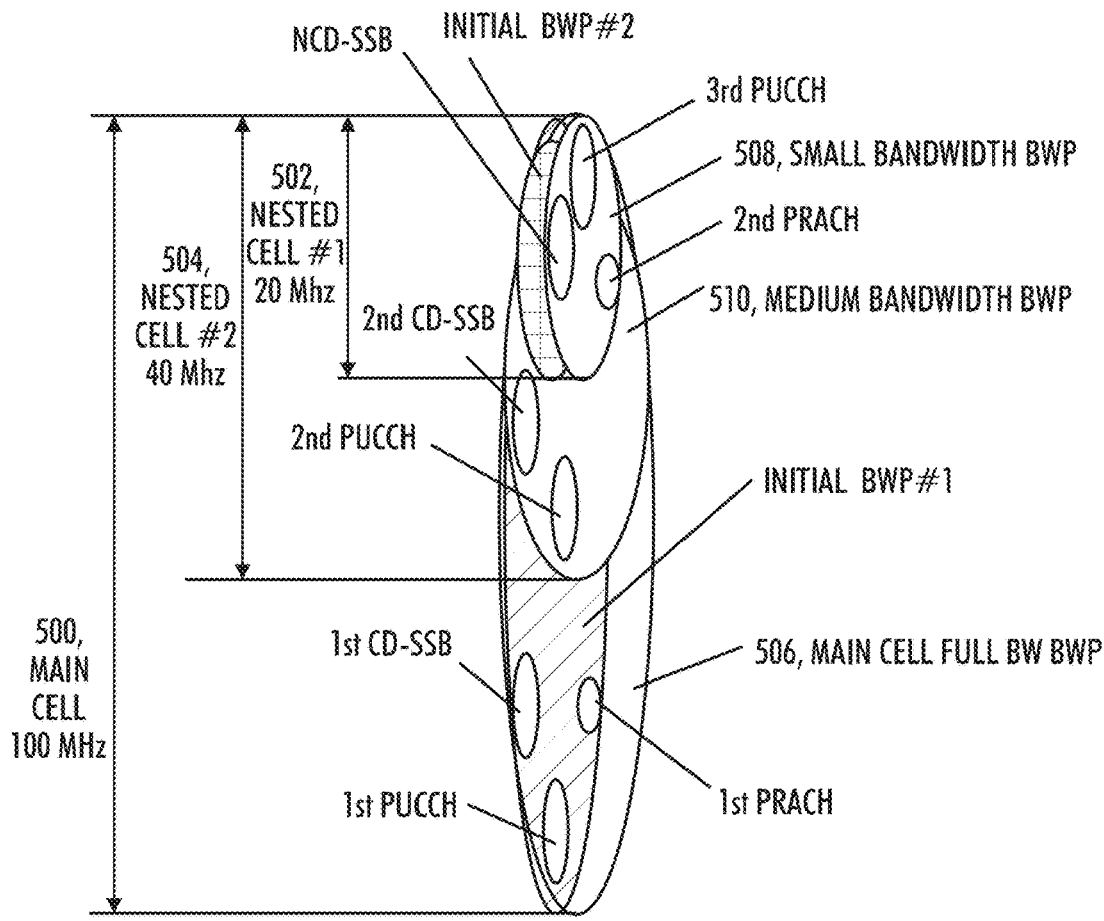
FIGS. 5A, 5B and 6 illustrate examples of main and nested cells.

FIG. 5A illustrates an example of a structure. The nested cell system comprises the main cell 500 having a full bandwidth BWP 506, a nested cell #1 502 with a small BWP 508, and a nested cell #2 504 with a medium size BWP 510.

The main cell 500 owns all cell components used in the nested cell structure but do not necessarily use all of them to handle a terminal device connected to the main cell. The main cell shares its components with nested cells. The main cell and nested cells may have the same PCI and Cell Identity which make the nested cell structure not visible from Core Network. In case the main cell and nested cells have same PCI and/or Cell Identity the Core Network will consider the nested cell structure as one single cell.

In case of the main cell and nested cells have different PCI and/or Cell Identity, the Core Network will consider nested cell structure as the set of separate 5G cells.

As the PCI is encoded with Secondary Synchronization Signal, SSS, and Primary Synchronization Signal, PSS, in SSB, to avoid collision it shall not be reused in the different cells transmitted on the same GSCN in the same coverage area.

In case of the nested cell structure, the usage of the same PCI in the same coverage area will not case a collision as each cell (main cell or nested cell) will use SSB assigned to different GSCN.

In the example of FIG. 5A, the main cell has following components:
1st CD-SSB, 2nd CD SSB, NCD-SSB.
1st PUCCH, 2nd PUCCH, 3rd PUCCH, 1st PRACH, 2nd PRACH
BWPs: Initial BWP #1 (100 MHz), Initial BWP #2 (20 MHz), dedicated Bandwidth Part #1 (100 MHz), dedicated Bandwidth Part #2 (40 MHz) and dedicated Bandwidth Part #3 (20 MHz).

A terminal device in the main cell 500 can be configured with:
1st CD-SSB,
1st PUCCH, 3rd PUCCH, 1st PRACH
Initial BWP #1 (100 MHz)
dedicated Bandwidth Part #1 (100 MHz) and/or additionally: dedicated Bandwidth Part #2 (40 MHz) and dedicated Bandwidth Part #3 (20 MHz).
additionally a RedCap terminal device can use NCD-SSB with initial BWP #2 (20 MHz) acting as RedCap specific Initial BWP using 2nd PRACH.
Only a terminal device supporting 100 MHz bandwidth or RedCap terminal device can directly select the cell.

A terminal device in the nested cell #1 502 can be configured with:
2nd CD-SSB,
2nd PUCCH, 3rd PUCCH, 2nd PRACH
Initial BWP #2 (20 MHz)
dedicated Bandwidth Part #2 (40 MHz) and/or additionally: dedicated Bandwidth Part #3 (20 MHz)
additionally RedCap terminal device can use NCD-SSB with initial BWP #2 (20 MHz) acting as RedCap specific Initial BWP
a terminal device supporting 40 MHz bandwidth or RedCap terminal device directly can select the cell.

A terminal device in the nested cell #2 504 can be configured with:
NCD-SSB,
3rd PUCCH, 2nd PRACH
Initial BWP #2 (20 MHz)
dedicated Bandwidth Part #3 (20 MHz).
terminal devices cannot select the cell in Initial Access procedure (because it has no CD-SSB) but can be handed over to the cell from the other cell or can use the cell as P(S) Cell in carrier aggregation or MR-DC cell addition procedure.

Figure 5B:
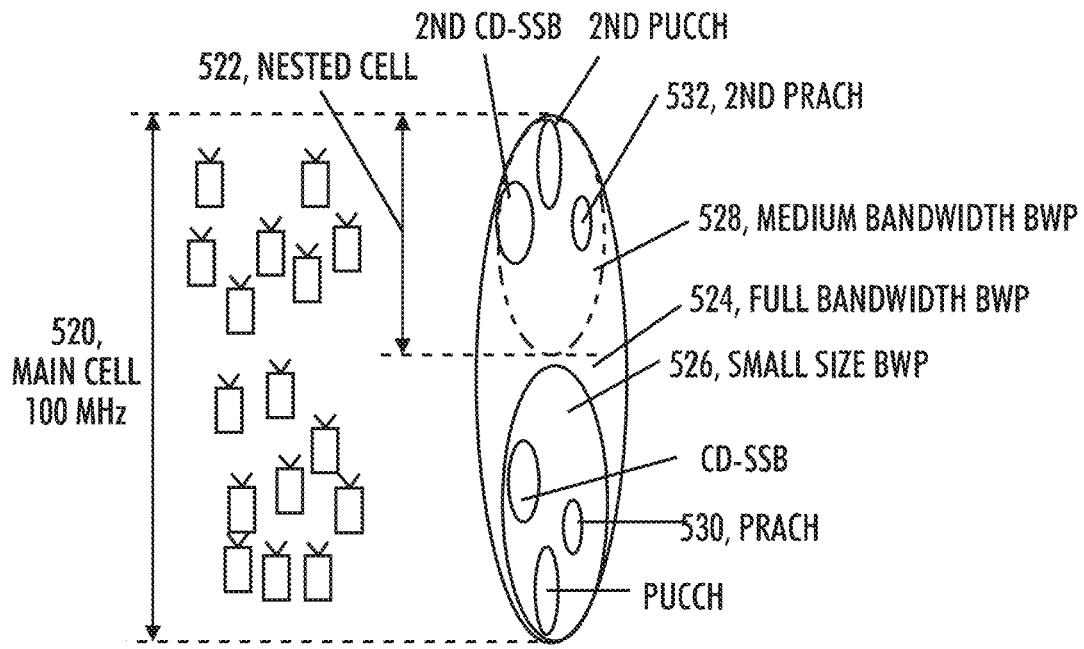

FIG. 5B illustrates another example of a nested cell structure. The nested cell system comprises the main cell 520 with a full bandwidth BWP 524 and a small BWP 526. The nested cell 522 with a medium bandwidth BWP 528.

The main cell 520 can contain two instances of the PRACH region and use only one. The first PRACH 530 can be used by the main cell since the 2nd PRACH 532 can be used only by the nested cell 522. In this configuration 2nd PRACH belongs to the main cell but is not used by it.

A single scheduler (MAC) of the main cell may handle all traffic in the nested cell system.

Each cell in the system using Bandwidth Parts, BWPs, can partly or fully share the frequency bandwidth with the other cell in the system. All BWPs are defined in the structure of the main cell and can be used by nested cells defined in the nested cell system.

In an embodiment, cells in a nested cell structure can be of two types, a standalone cell and non-standalone cell. The main cell is always standalone cell. A standalone cell has a CD-SSB with MIB message and accompanied CORESET0 with SIB1 transmitted on it. Thus, a terminal device can directly camp on a standalone cell as an independent 5G cell and not be aware that the cell is part of the nested cell system. A terminal device can not directly camp on a non-standalone cell but only via handover, carrier aggregation or MR-DC, for example. Terminal devices are not able to use a non-standalone nested cell without assist from 5G RAN network (gNB) and using other standalone 5G cell (which can be main cell or standalone nested cell) as an entry point to the system with initial access scenario.

A non-standalone nested cell can't be used by a terminal device to perform initial access scenario to access the non-standalone nested cell. Scenarios driven by the 5G RAN network (gNB) like mobility procedures, reestablishment, carrier aggregation SCell addition, dual connectivity PSCell setup can be used to admit a terminal device to the non-standalone Nested Cell.

A non-standalone nested cell can be for example configured with the SSB not aligned to global synchronization channel number (GSCN) raster or without CORESET0 which will make it not discoverable for the terminal devices reselecting the cell. The lack of CORESET0 associated to the CD-SSB is indicated to the terminal device with MIB: ssb-SubcarrierOffset information element defining $24<=kSSB<=29$ for Frequency Range1 or $12<=kSSB<=13$ for Frequency Range2 as defines in the 3GPP specifications.

A non-standalone nested cell may reuse a CD-SSB of another cell present in the nested cell system or have own CD-SSB with a MIB message. As in non-standalone cell the configuration is provided to a terminal device with RRC signaling during transfer procedure, transmitting the CORE- SET0 is not mandatory for this cell. The non-standalone nested cell can provide the common RRC signaling (e.g., SIBs messages) using dedicated CORESET with common Search Spaces instead of CORESET0. The usage of the dedicated CORESET with common Search Spaces allows to ignore CORESET0 associated to the CD-SSB in case of reuse CD-SSB of other standalone cell in the nested cell system. A non-standalone nested cell can be also built with NCD-SSB for RedCap terminal device handling purposes, for example.

In an embodiment, the main cell and standalone nested cell(s) may be organized as a balanced structure where each cell can be an entry point to the cell structure. All cells in the system may have Synchronization Signal Block (SSB), CORESET0, SIBs, PRACH and may have the same PCI and cell identity. SSBs in cell structure do not overlap in frequency range. The main cell and standalone nested cell(s) are visible to terminal devices as a set of independent cells.

In an embodiment, the main cell and non-standalone nested cell(s) may be organized as a hierarchical structure where the main cell is an entry point for a terminal device and then the terminal device may be transferred to a non-standalone nested cell. The terminal devices access with initial access scenario to main cell. After that, based on chosen criteria, the terminal device may be moved to a non-standalone nested cell.

As the examples of FIGS. 5A and 5B illustrate, various combinations of standalone and non-standalone cells and main cell are possible.

A terminal device may be transferred from a main cell to a nested cell or between nested cells for various reasons. For example, the reason may be load balancing to avoid intensive usage one of the parts of main cell bandwidth and efficiently use whole bandwidth. Another reason may be that a terminal device requires specific bandwidth which may be not possible to be handled in the current cell. For example, a RedCap terminal device may not be handled in 100 MHz Main Cell and thus may be transferred to a nested cell created for that purpose. The terminal device may be transferred also from the cells outside the Nested Cell System including external cell working in other technologies (eg. LTE.

The transfer of a terminal device from one cell to another cell belonging to the same Nested Cell System can be performed by the gNB which initiates inter-cell handover from the main cell to nested cell (or opposite). As the main cell and nested cells share the same bandwidth and radio unit and have the same coverage, there is no need to configure measurements on the terminal device and wait for a Measurements Report to trigger the handover. The decision to make the transfer may be taken based on the gNB internal algorithms, blindly assuming sufficient radio condition on target cell. In case of the handover type transfer from the one cell to another the terminal device may be moved by sending a RRC Reconfiguration message with ReconfigurationWithSync structure ordering transfer to the target cell in the nested cell structure.

Other methods to transferring a terminal device between cells in the nested cell structure may also be used. The transfer of a terminal device may be performed in all directions: from the main cell to a nested cell, from a nested cell to the main cell and from one nested cell to another nested cell.

Figure 6:
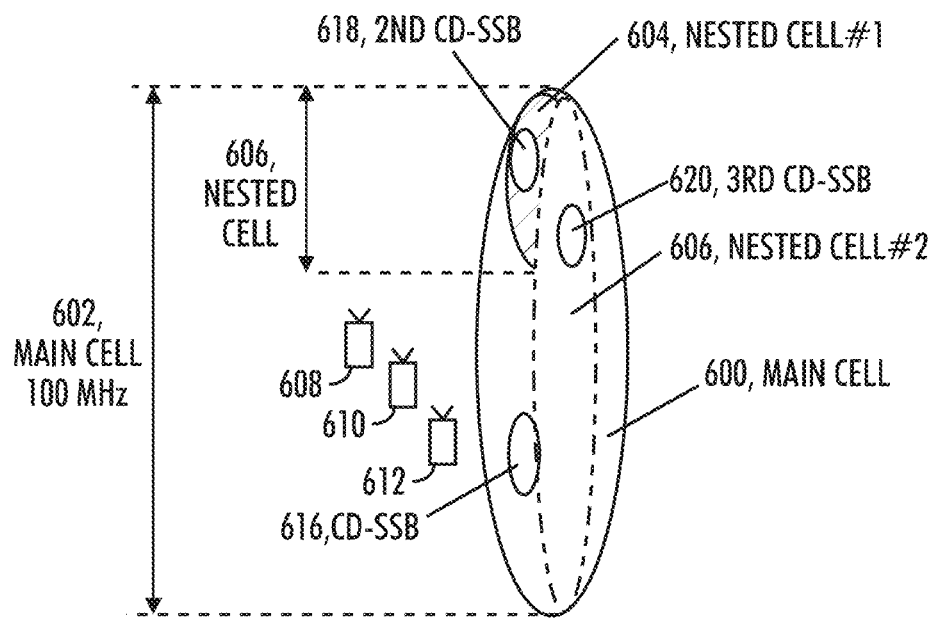

In the example of FIG. 6, a nested cell system comprises a main cell 600 with the cell bandwidth 602 of 100 MHz and a CD-SSB 616, a standalone nested cell 604 with a bandwidth 606 of 20 MHz and a $2^{nd}$ CD-SSB 618 and a standalone nested cell 606 with the cell bandwidth 600 of 100 MHz and a $3^{rd}$ CD-SSB 620. Each cell has its own CD-SSB. It is further assumed, that the main cell 600 has a 20 MHz Initial BWP located at the top of the bandwidth. Following example scenarios are possible in the illustrated nested cell system simultaneously.

Scenario 1: A terminal device 608 capable to handling 100 MHz bandwidth is selecting nested cell 604 with a 20 MHz bandwidth and camps on the cell with Initial Access procedure. The gNB, based on capability of the terminal device 608, decides to transfer the terminal device to the main cell 600 which is more suitable for the terminal device capable of 100 MHz bandwidth.

Scenario 2: A RedCap terminal device 610 supporting 20 MHz bandwidth synchronizes to the CD-SSB of the main cell 600 on lower part of bandwidth. The RedCap terminal device selects the main cell and camps on the cell with Initial Access procedure (here it is assumed that the main cell is configured to allow a RedCap device to camp on it, i.e., it must have a 20 MHz Initial BWP). However, the gNB can handle the RedCap terminal device with 20 MHz dedicated BWP located on top of the bandwidth but due to BWP restriction the RedCap terminal device cannot use top located dedicated BWP with CD-SSB on low part of bandwidth which is outside the 20 MHZ BWP. Thus, the gNB initiates a transfer of the RedCap terminal device to the nested cell 604.

Scenario 3: A terminal device 612 supporting a 100 MHz bandwidth selects the main cell and camps on the cell with Initial Access procedure. The terminal device needs to be configured with power saving mode. It can be configured with 100 MHz dedicated BWP as main bandwidth part in normal mode but in power saving mode it uses only 20 MHz bandwidth. Unfortunately, due to BWP restriction the terminal device can't use 20 MHz Initial BWP in power saving mode because the Initial BWP is located on top of the bandwidth but CD-SSB of the main cell is located on lower part of bandwidth. But as the nested cell system has a nested cell 606 which uses second instance of CD-SSB (3rd CD-SSB located on top of the bandwidth) and which overlaps with both 100 MHz dedicated BWP and 20 MHz BWP, the nested cell system can support the terminal device both in normal mode and power saving mode. The gNB initiates transfer of the terminal device 612 to the nested cell 606 and configure both 100 MHz dedicated BWP as main bandwidth part and 20 MHz BWP to be used in power saving mode.

Thus, the proposed cell structure provides a flexible arrangement for terminal devices to camp on.

The problem of non-balanced load on the cell frequency bandwidth is solved by utilising a cell configuration with multiple BWPs of different sizes. Providing additional nested cells, based on the resources of the main cell (such as additional BWPs, SSB, PUCCH, PRACH located in non-loaded frequency), unbalanced cell load may be avoided. By duplicating the cell resources (multiple SSB/PBCH, PRACH, PUCCH area) and utilising BWPs in non-loaded area, cell bandwidth can be utilised more efficiently than in prior art solutions.

The call bandwidth may be utilised more efficiently by providing cells in a nested structure. The main cell may cover the whole cell bandwidth and the nested cells may cover bandwidth areas previously utilised with only low load due to bandwidth restrictions, for example.

As mentioned, from the terminal device point of view the cells in a nested cell system may be visible as independent cells. From the gNB point of view the nested cell system provides the possibility to utilise the cell bandwidth better to match with the terminal device capabilities. The problem with allocation and access to the small parts of the cell bandwidth in cells with large bandwidth is solved by the introduction of the nested cells with smaller BWPs.

A nested cell can provide optimized access to the BWPs with limited bandwidth (eg. 5 MHz bandwidth) in large cells (eg. 100 MHz bandwidth) for the terminal devices. With the nested cell structure, a gNB can offer two views of the cell: First, a main cell optimized for terminal devices supporting non-limited bandwidth with high transfer demand by using a Initial BWP having such a size that terminal devices supporting only a small bandwidth cannot access the main cell. Second, a nested cell optimized for terminal devices supporting limited bandwidth (e.g., RedCap terminal device).

Thus, the terminal devices which support limited bandwidth will skip the main cell optimized for terminal device supporting large bandwidth because the initial BWP defined in this cell view will block that access for those terminal devices.

The terminal devices supporting large bandwidth can directly connect to the main cell which is optimized for such type of terminal devices.

In case of a terminal device which supports large bandwidth selects a small nested cell, the gNB may be redirect, or transfer the terminal device with mobility procedures to the main cell if needed.

Figure 7A:
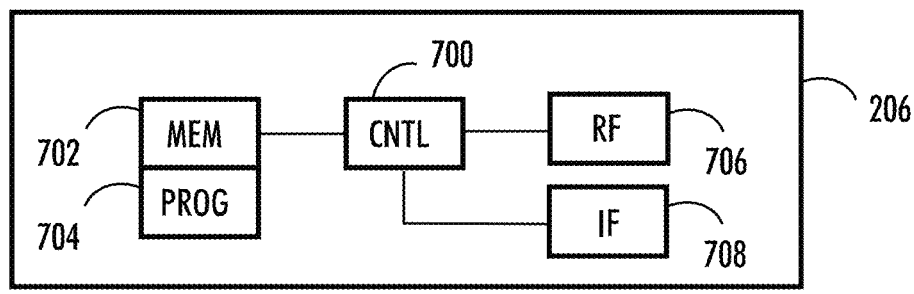
FIGS. 7A and 7B illustrate simplified examples of apparatuses applying some embodiments.
Figure 7B:
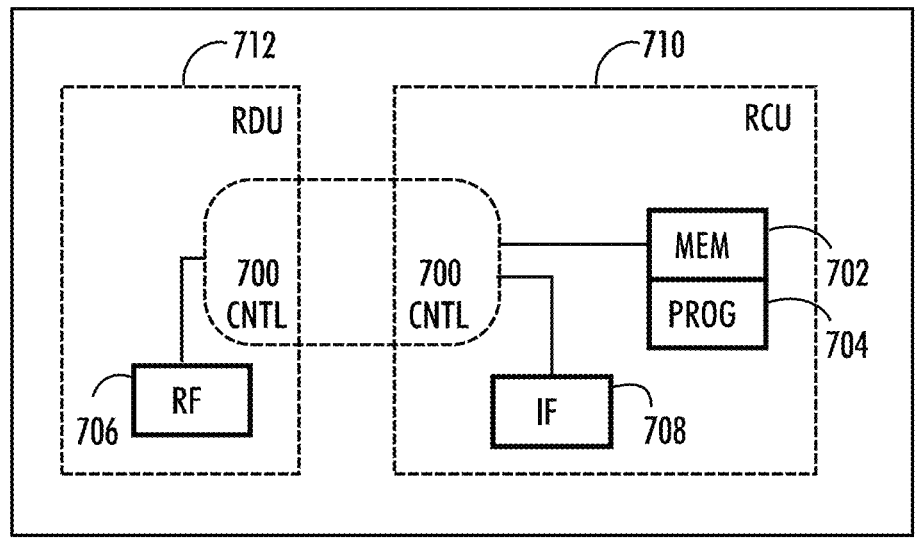

FIGS. 7A and 7B and illustrate embodiments. The figures illustrate simplified examples of apparatuses applying embodiments of the invention. It should be understood that the apparatuses are depicted herein as examples illustrating some embodiments. It is apparent to a person skilled in the art that the apparatuses may also comprise other functions and/or structures and not all described functions and structures are required. Although the apparatuses have been depicted as one entity, different modules and memory may be implemented in one or more physical or logical entities.

FIG. 7A illustrates an example of an apparatus which may be a base station, gNodeB 206 or a part of base station or a gNodeB.

The apparatus 206 of the example includes a control circuitry 700 configured to control at least part of the operation of the apparatus.

The apparatus may comprise a memory 702 for storing data. Furthermore, the memory may store software 704 executable by the control circuitry 700. The memory may be integrated in the control circuitry.

The apparatus may comprise one or more interface circuitries 706. The interface circuitries are operationally connected to the control circuitry 700. An interface circuitry 706 may be a set of transceivers configured to communicate wirelessly with terminal devices or user equipment of a wireless communication network. The interface circuitry may be connected to an antenna arrangement (not shown). The apparatus may also comprise a connection to a transmitter instead of a transceiver. The apparatus may further comprise an interface 708 configured to communicate with other network elements such a core network or other corresponding apparatuses, for example a user interface.

In an embodiment, the software 704 may comprise a computer program comprising program code means adapted to cause the control circuitry 700 of the apparatus to realise at least some of the embodiments described above.

In an embodiment, as shown in FIG. 7B, at least some of the functionalities of the apparatus of FIG. 7A may be shared between two physically separate devices, forming one operational entity. Therefore, the apparatus may be seen to depict the operational entity comprising one or more physically separated devices for executing at least some of the described processes. Thus, the apparatus of FIG. 7B, utilizing such shared architecture, may comprise a remote control unit RCU 710, such as a host computer or a server computer, operatively coupled (e.g. via a wireless or wired network) to a remote distributed unit RDU 712 located in the (e/g) NB. In an embodiment, at least some of the described processes may be performed by the RCU 710. In an embodiment, the execution of at least some of the described processes may be shared among the RDU 712 and the RCU 710.

In an embodiment, the RCU 710 may generate a virtual network through which the RCU 710 communicates with the RDU 712. In general, virtual networking may involve a process of combining hardware and software network resources and network functionality into a single, software-based administrative entity, a virtual network. Network virtualization may involve platform virtualization, often combined with resource virtualization. Network virtualization may be categorized as external virtual networking which combines many networks, or parts of networks, into the server computer or the host computer (e.g. to the RCU). External network virtualization is targeted to optimized network sharing. Another category is internal virtual networking which provides network-like functionality to the software containers on a single system. Virtual networking may also be used for testing the terminal device.

In an embodiment, the virtual network may provide flexible distribution of operations between the RDU and the RCU. In practice, any digital signal processing task may be performed in either the RDU or the RCU and the boundary where the responsibility is shifted between the RDU and the RCU may be selected according to implementation.

The steps and related functions described in the above and attached figures are in no absolute chronological order, and some of the steps may be performed simultaneously or in an order differing from the given one. Other functions can also be executed between the steps or within the steps. Some of the steps can also be left out or replaced with a corresponding step.

The apparatuses or controllers able to perform the above-described steps may be implemented as an electronic digital computer, processing system or a circuitry which may comprise a working memory (random access memory, RAM), a central processing unit (CPU), and a system clock. The CPU may comprise a set of registers, an arithmetic logic unit, and a controller. The processing system, controller or the circuitry is controlled by a sequence of program instructions transferred to the CPU from the RAM. The controller may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory (ies) that work together to cause an apparatus to perform various functions, and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

An embodiment provides a non-transitory computer program embodied on a distribution medium, comprising program instructions which, when loaded into an electronic apparatus, are configured to control the apparatus to execute the embodiments described above. The term "non-transitory," as used herein, is a limitation of the medium itself (i.e., tangible, not a signal) as opposed to a limitation on data storage persistency (e.g., RAM vs. ROM).

The computer program may be in source code form, object code form, or in some intermediate form, and it may be stored in some sort of carrier, which may be any entity or device capable of carrying the program. Such carriers include a record medium, computer memory, read-only memory, and a software distribution package, for example. Depending on the processing power needed, the computer program may be executed in a single electronic digital computer or it may be distributed amongst several computers.

The apparatus may also be implemented as one or more integrated circuits, such as application-specific integrated circuits ASIC. Other hardware embodiments are also feasible, such as a circuit built of separate logic components. A hybrid of these different implementations is also feasible. When selecting the method of implementation, a person skilled in the art will consider the requirements set for the size and power consumption of the apparatus, the necessary processing capacity, production costs, and production volumes, for example.

It will be obvious to a person skilled in the art that, as the technology advances, the inventive concept can be implemented in various ways. The invention and its embodiments are not limited to the examples described above but may vary within the scope of the claims.

The invention claimed is:

1. An apparatus in a communication system, comprising:
a processor; and a memory including instructions, the instructions, when executed by the processor, cause the apparatus to:
transmit a cell defining Synchronization Signal Block on a first frequency location inside a given frequency bandwidth;
transmit a second Synchronization Signal Block on a second frequency location inside a second bandwidth inside the given frequency bandwidth;
provide a main cell on the given frequency bandwidth by utilising the cell defining Synchronization Signal Block; and
provide at least one second cell on the second bandwidth within the given frequency bandwidth by utilising the second Synchronization Signal Block, wherein
the main cell and the at least one second cell have the same Physical Cell Identifier and Cell Identity, and
the main and the at least one second cell serving the same geographical area.

2. The apparatus of claim 1, wherein the second Synchronization Signal Block is a cell defining Synchronization Signal Block.

3. The apparatus of claim 1, wherein the second Synchronization Signal Block is a non cell defining Synchronization Signal Block.

4. The apparatus of claim 1, wherein the second bandwidth within the given frequency bandwidth is narrower than the given frequency bandwidth.

5. The apparatus of claim 1, wherein the second bandwidth within the given frequency bandwidth equals to the given frequency bandwidth.

6. The apparatus of claim 1, the memory and the computer program code configured to, with the processor, cause the apparatus further to:
maintain in the main cell one or more bandwidth parts within the given frequency bandwidth to which bandwidth parts terminal devices may be allocated and providing shared common resources for the bandwidth parts within the given frequency bandwidth;
and maintaining in the at least one second cell at least one second bandwidth part within the second bandwidth and providing shared common resources for the second bandwidth part within the second bandwidth.

7. The apparatus of claim 1, the memory and the computer program code configured to, with the processor, cause the apparatus further to:
maintain in the main cell at least one bandwidth part for uplink and downlink communication with terminal devices and
maintain in the at least one second cell at least one bandwidth part for downlink communication with terminal devices.

8. The apparatus of claim 1, the memory and the computer program code configured to, with the processor, cause the apparatus further to:
maintain in the main cell at least one bandwidth part for uplink and downlink communication with terminal devices and
maintain in the at least one second cell at least one bandwidth part for uplink and downlink communication with terminal devices.

9. The apparatus of claim 1, the memory and the computer program code configured to, with the processor, cause the apparatus further to:
schedule terminal devices to the main and at least one second cell with the same scheduler process.

10. The apparatus of claim 1, the memory and the computer program code configured to, with the processor, cause the apparatus further to:
schedule a terminal device from the main cell to a second cell in response to increased load in the main cell.

11. The apparatus of claim 1, the memory and the computer program code configured to, with the processor, cause the apparatus further to:
schedule a terminal device from the main cell to a second cell based on the bandwidth required by the terminal device.

12. The apparatus of claim 1, the memory and the computer program code configured to, with the processor, cause the apparatus further to:
  schedule a terminal device from the main cell to a second cell based on at least one of the following:
  specific terminal device capabilities;
  operator preferences of distributing terminal devices between cells;
  subscriptions or network preferences.

13. A method in an apparatus in a communication system comprising the steps of:
  transmitting a cell defining Synchronization Signal Block on a first frequency location inside a given frequency bandwidth; and
  transmitting a second Synchronization Signal Block on a second frequency location inside a second bandwidth inside the given frequency bandwidth;
  providing a main cell on the given frequency bandwidth by utilising the cell defining Synchronization Signal Block; and
  providing at least one second cell on the second bandwidth within the given frequency bandwidth by utilising the second Synchronization Signal Block, wherein
  the main cell and the at least one second cell have the same Physical Cell Identifier and Cell Identity, and
  the main and the at least one second cell serving the same geographical area.

14. The method of claim 13, wherein the second bandwidth within the given frequency bandwidth is narrower than the given frequency bandwidth.

15. The method of claim 13, further comprising:
  maintaining in the main cell one or more bandwidth parts within the given frequency bandwidth to which bandwidth parts terminal devices may be allocated and providing shared common resources for the bandwidth parts within the given frequency bandwidth;
  maintaining in the at least one second cell at least one second bandwidth part within the second bandwidth and providing shared common resources for the second bandwidth part within the second bandwidth.

16. The method of claim 13, further comprising:
  maintaining in the main cell at least one bandwidth part for uplink and downlink communication with terminal devices and
  maintaining in the at least one second cell at least one bandwidth part for downlink communication with terminal devices.

17. The method of claim 13, further comprising:
  maintaining in the main cell at least one bandwidth part for uplink and downlink communication with terminal devices and
  maintaining in the at least one second cell at least one bandwidth part for uplink and downlink communication with terminal devices.

18. A non-transitory computer readable medium comprising program instructions that, when executed by an apparatus, cause the apparatus to perform at least the following:
  transmit a cell defining Synchronization Signal Block on a first frequency location inside a given frequency bandwidth;
  transmit a second Synchronization Signal Block on a second frequency location inside a second bandwidth inside the given frequency bandwidth;
  provide a main cell on the given frequency bandwidth by utilising the cell defining Synchronization Signal Block; and
  provide at least one second cell on the second bandwidth within the given frequency bandwidth by utilising the second Synchronization Signal Block, wherein
  the main cell and the at least one second cell have the same Physical Cell Identifier and Cell Identity, and
  the main and the at least one second cell serving the same geographical area.

* * * * *